March 25, 1952     E. S. HINELINE     2,590,409
HAND-HELD ROLL-FILM CAMERA
Original Filed Aug. 10, 1946     11 Sheets-Sheet 1
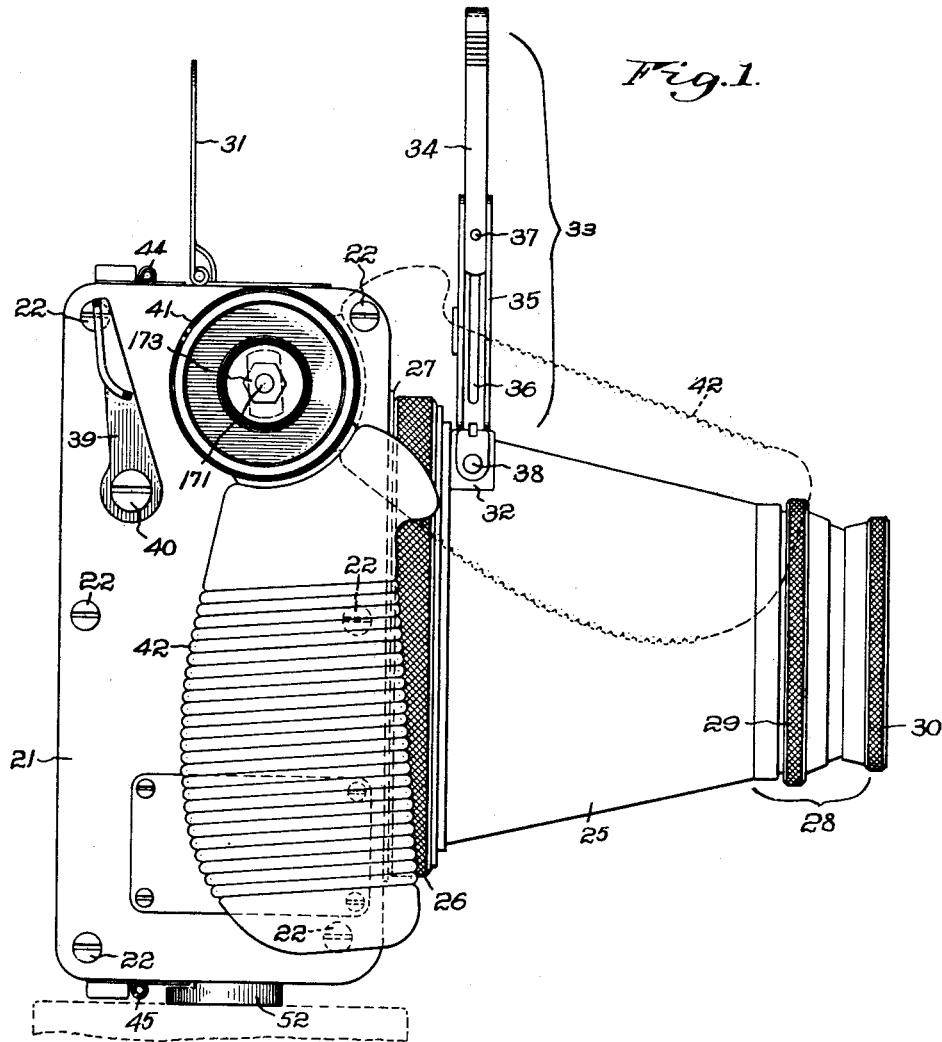
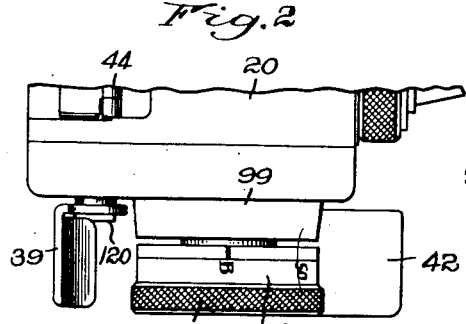
INVENTOR.
Edson S. Hineline
BY
Emery, Booth, Townsend, Miller and Turner
his Attorneys March 25, 1952     E. S. HINELINE     2,590,409
HAND-HELD ROLL-FILM CAMERA
Original Filed Aug. 10, 1946     11 Sheets-Sheet 2
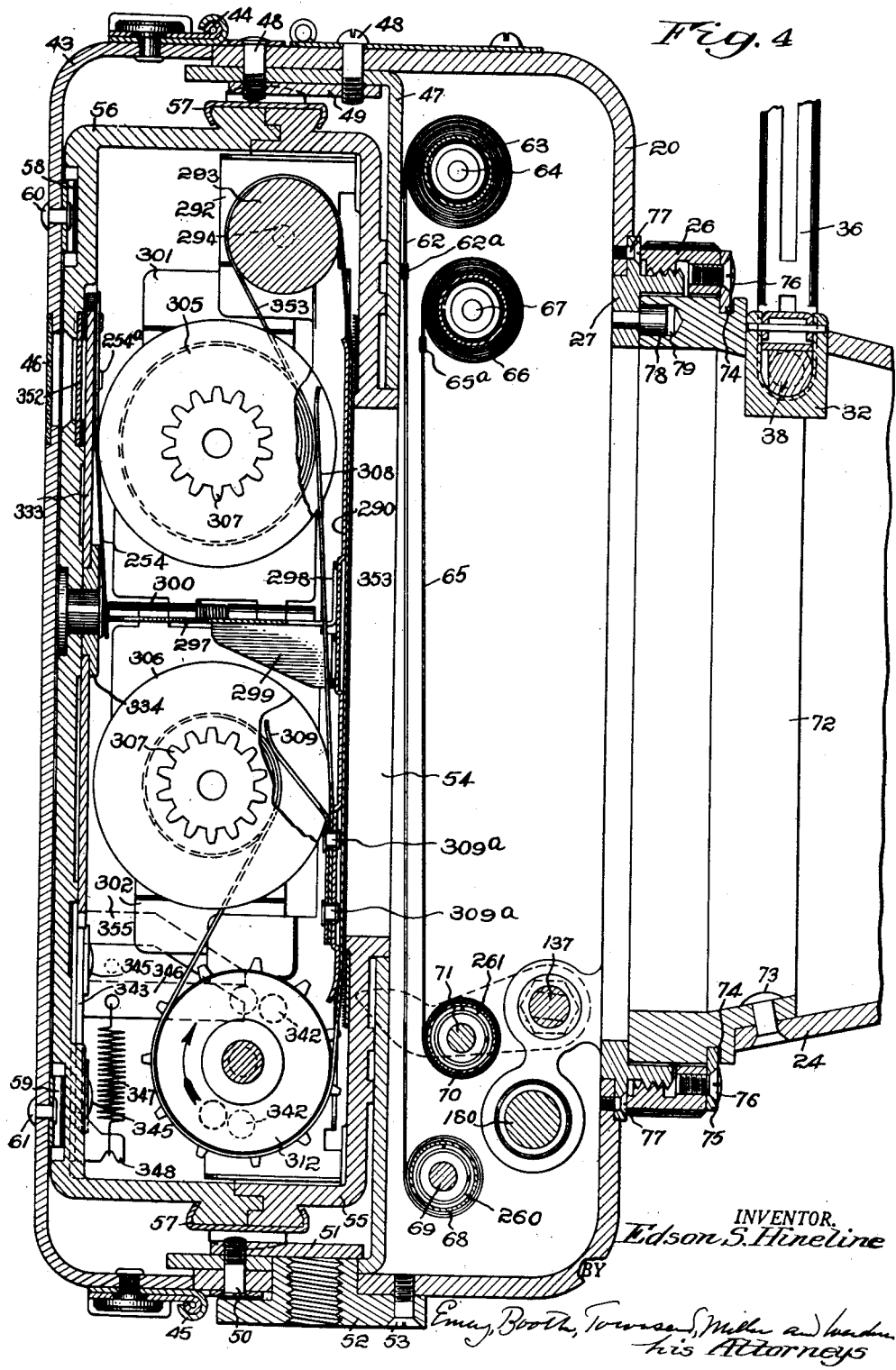

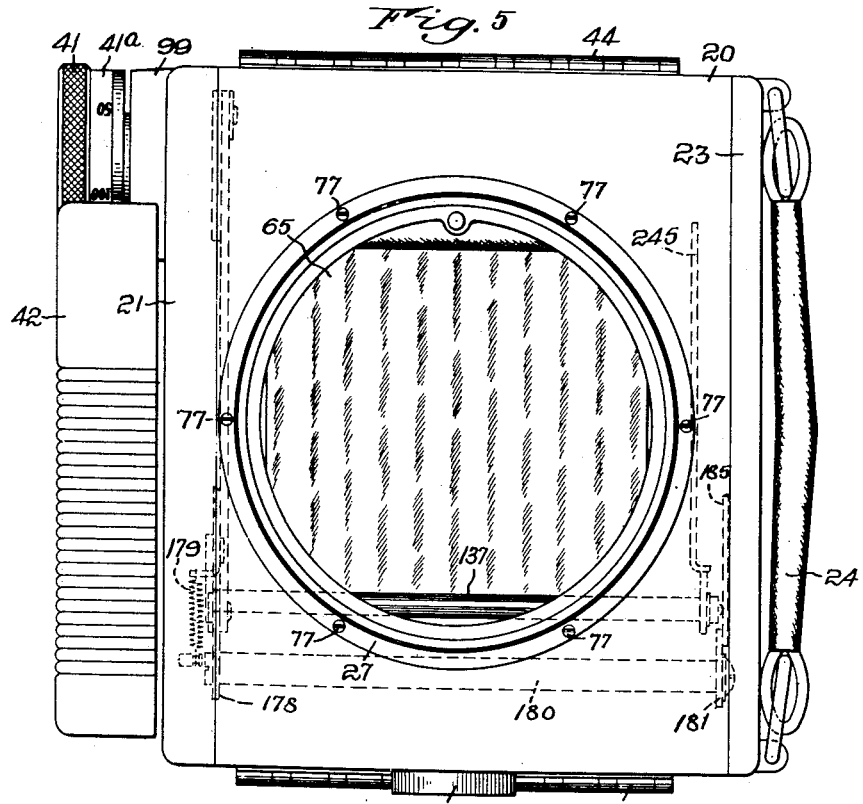
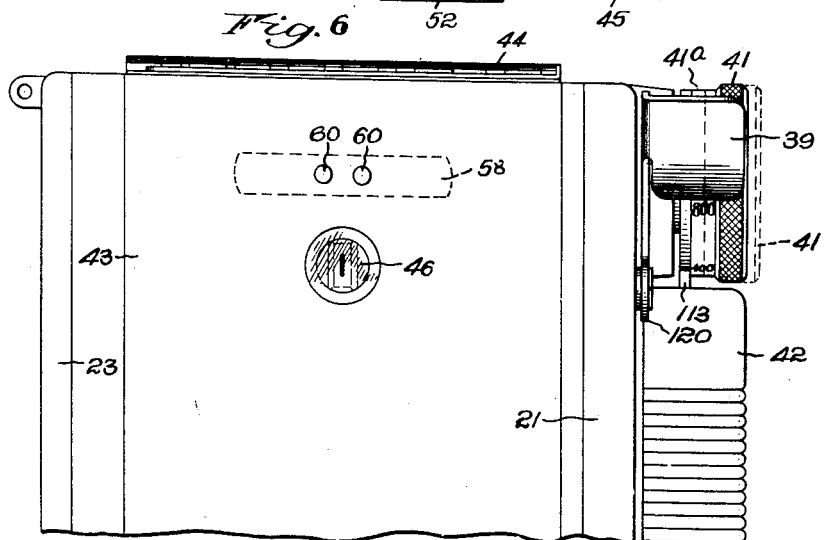

March 25, 1952     E. S. HINELINE     2,590,409
HAND-HELD ROLL-FILM CAMERA
Original Filed Aug. 10, 1946     11 Sheets-Sheet 4
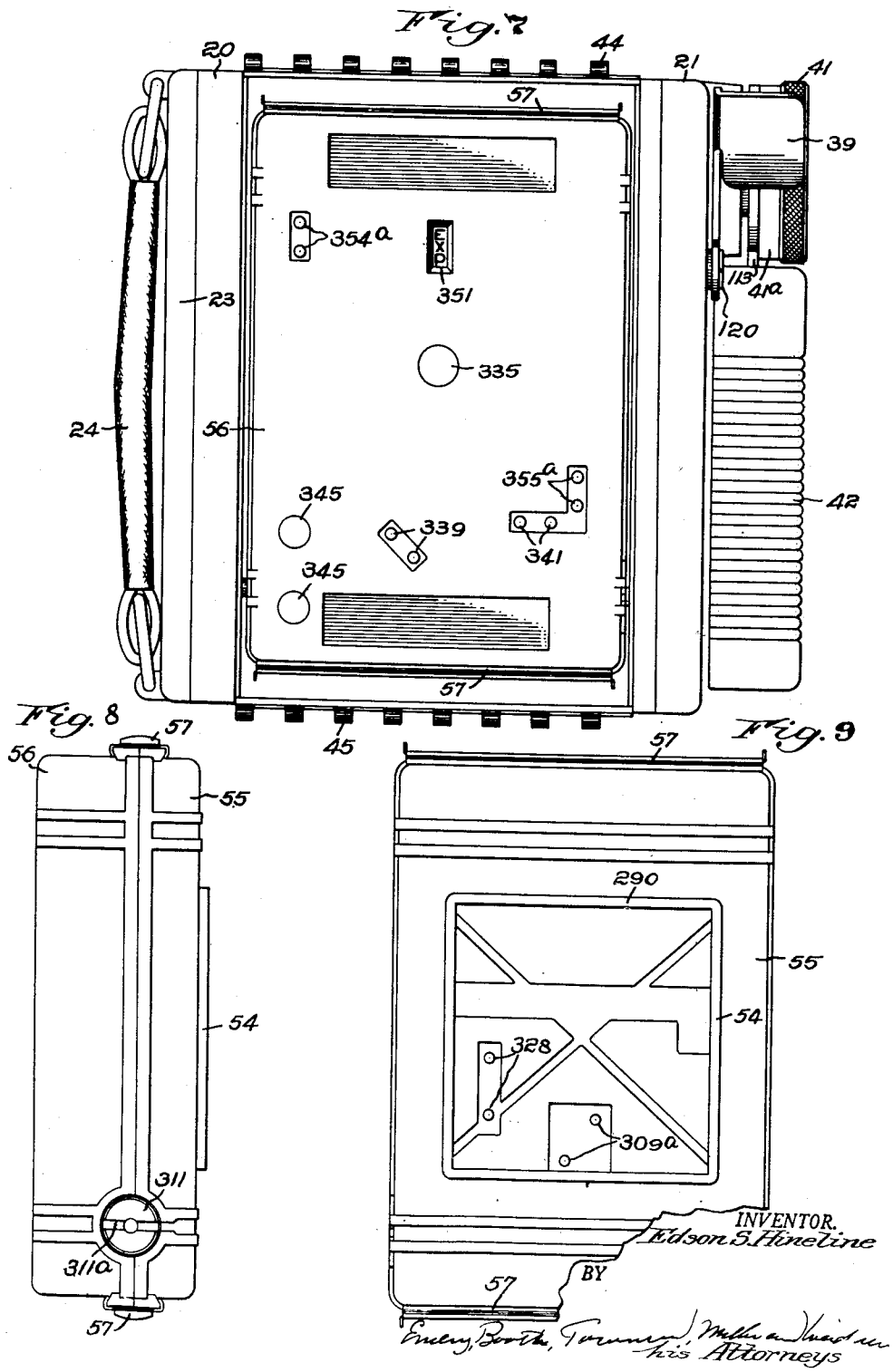

March 25, 1952     E. S. HINELINE     2,590,409
HAND-HELD ROLL-FILM CAMERA
Original Filed Aug. 10, 1946             11 Sheets-Sheet 5

INVENTOR.
Edson S. Hineline
BY Emery Booth, Townsend, Miller and Lueders
his Attorneys March 25, 1952     E. S. HINELINE     2,590,409
HAND-HELD ROLL-FILM CAMERA
Original Filed Aug. 10, 1946     11 Sheets-Sheet 6
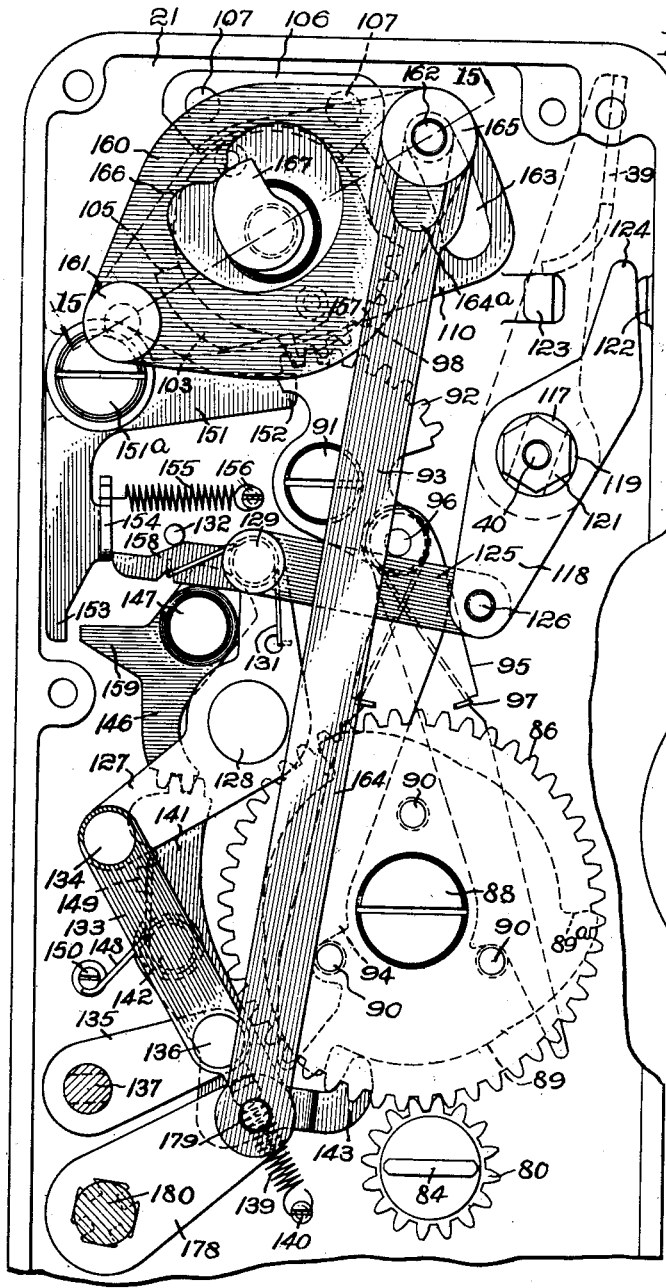
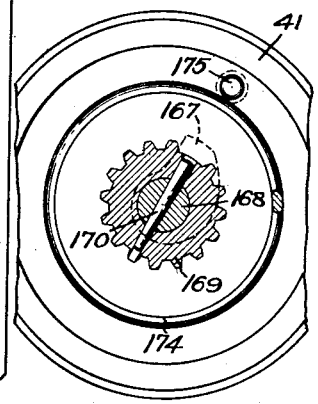
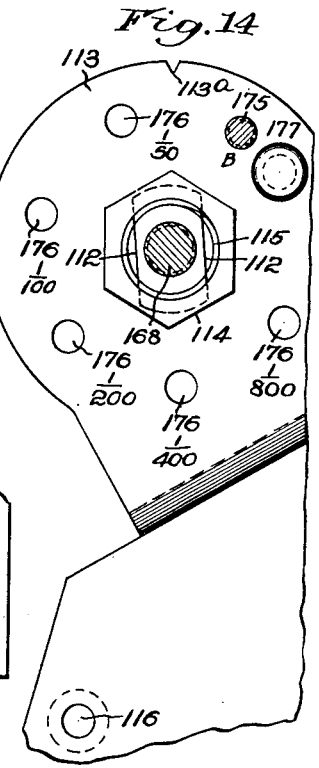
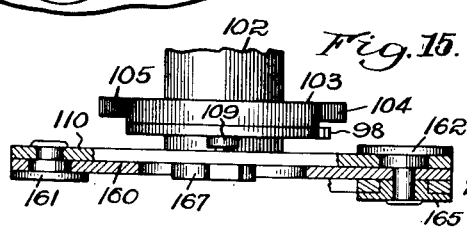
INVENTOR.
Edson S. Hineline
BY
his Attorneys March 25, 1952  E. S. HINELINE  2,590,409
HAND-HELD ROLL-FILM CAMERA
Original Filed Aug. 10, 1946  11 Sheets-Sheet 7

INVENTOR.
Edson S. Hineline
BY
Emery, Booth, Townsend, Miller and Widner
his Attorneys March 25, 1952  E. S. HINELINE  2,590,409
HAND-HELD ROLL-FILM CAMERA
Original Filed Aug. 10, 1946  11 Sheets-Sheet 8
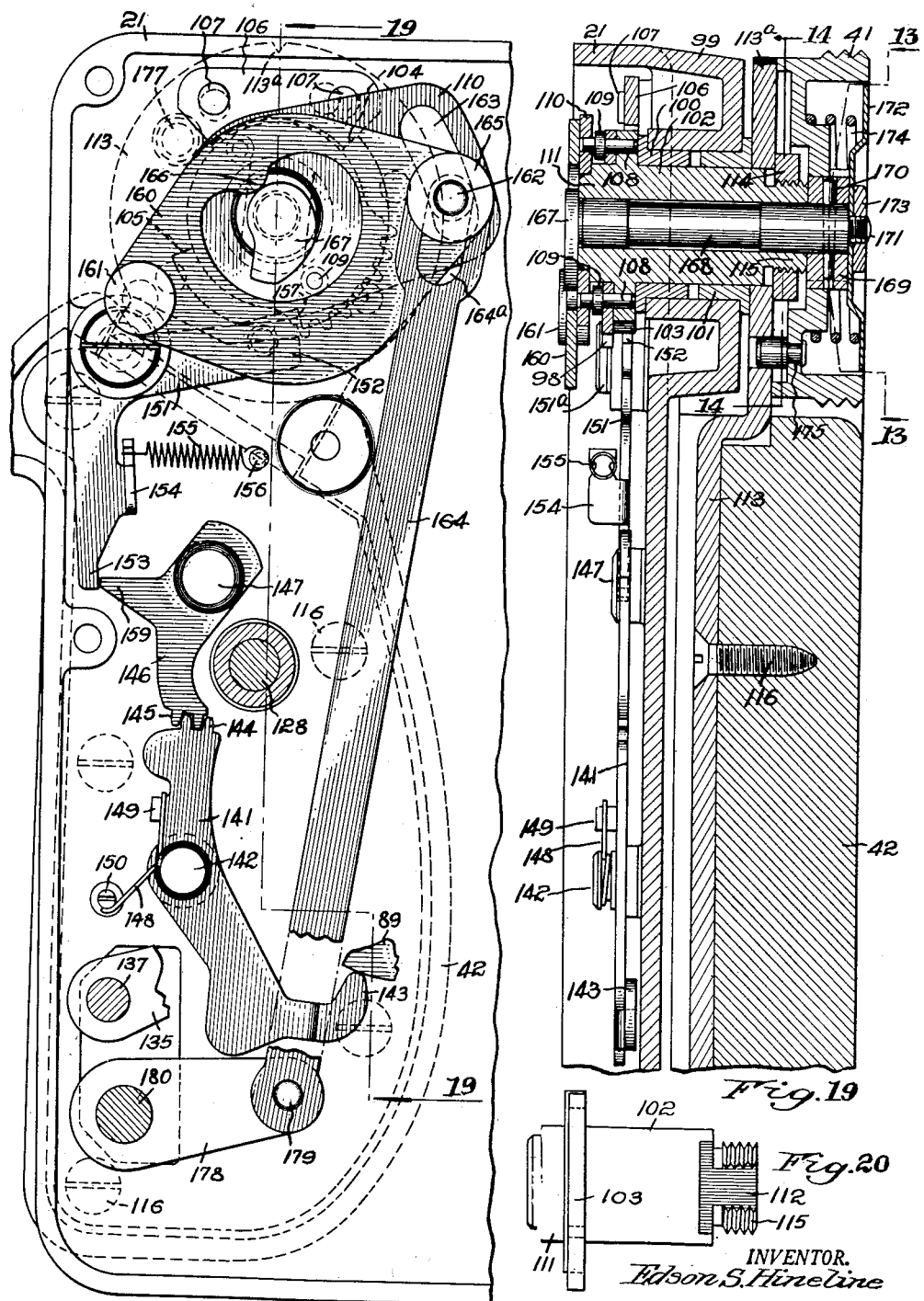

March 25, 1952　　　　　E. S. HINELINE　　　　　2,590,409
HAND-HELD ROLL-FILM CAMERA
Original Filed Aug. 10, 1946　　　　　　　　　11 Sheets-Sheet 9
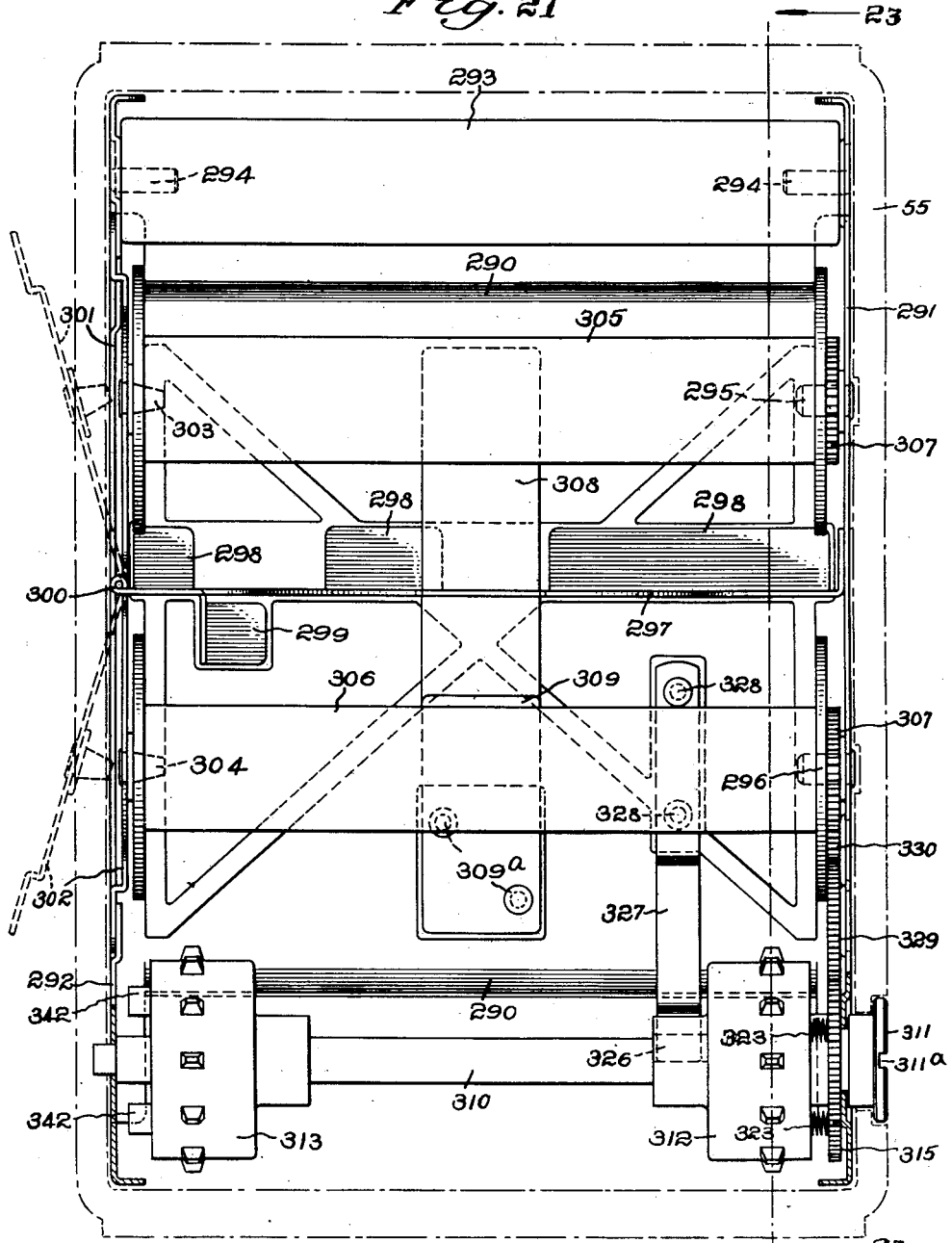
INVENTOR.
Edson S. Hineline
BY
his Attorneys March 25, 1952  E. S. HINELINE  2,590,409
HAND-HELD ROLL-FILM CAMERA
Original Filed Aug. 10, 1946  11 Sheets-Sheet 10
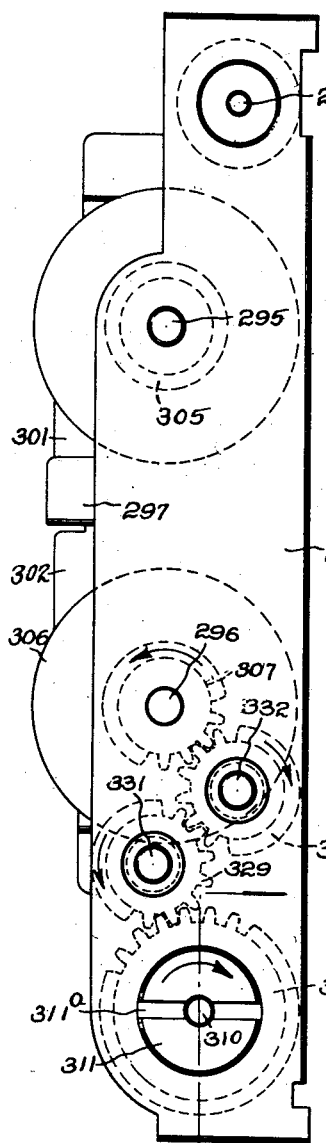
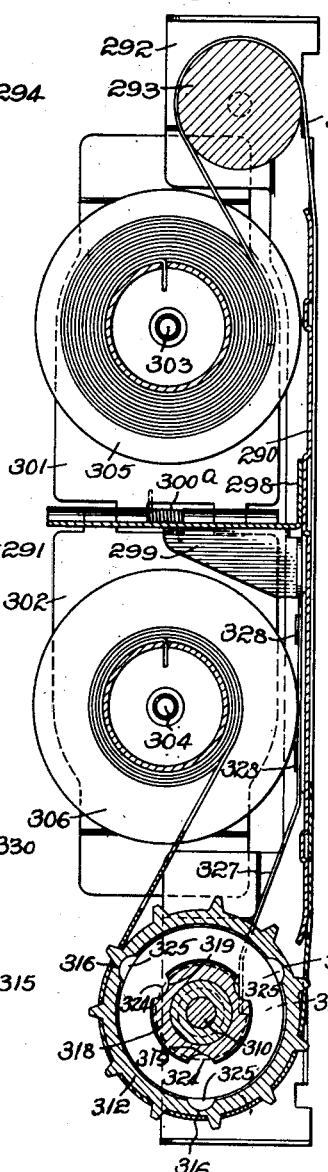
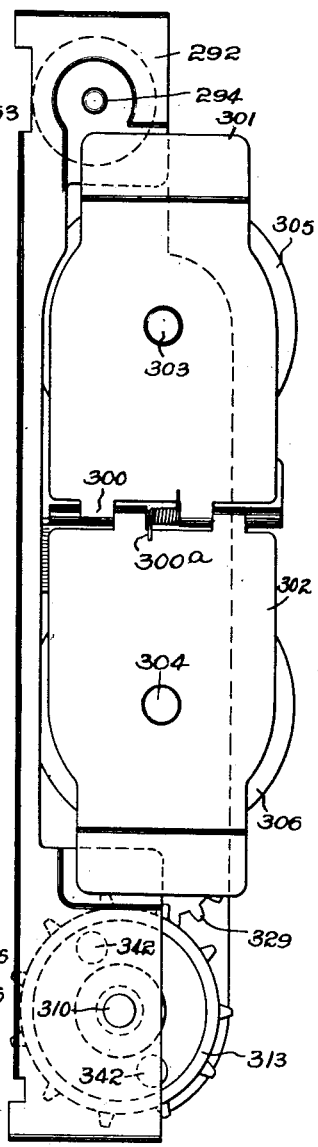
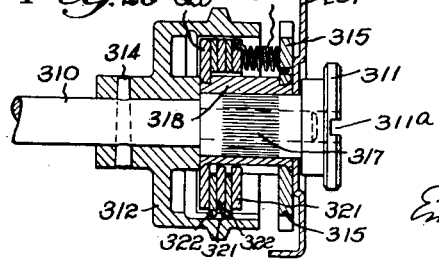
INVENTOR.
Edson S. Hineline
BY
Emery Booth, Townsend, Miller and Laidlaw
his Attorneys March 25, 1952     E. S. HINELINE     2,590,409
HAND-HELD ROLL-FILM CAMERA
Original Filed Aug. 10, 1946     11 Sheets-Sheet 11

INVENTOR.
Edson S. Hineline
BY
his Attorneys

Patented Mar. 25, 1952

2,590,409

UNITED STATES PATENT OFFICE 2,590,409

HAND-HELD ROLL-FILM CAMERA

Edson S. Hineline, Rochester, N. Y., assignor to Graflex, Inc., Rochester, N. Y., a corporation of Delaware Original application August 10, 1946, Serial No. 689,714, now Patent No. 2,556,967, dated June 12, 1951. Divided and this application July 24, 1947, Serial No. 763,238

62 Claims. (Cl. 95—34)

This application is division B of my co-pending application Ser. No. 689,714, filed August 10, 1946, now Patent Number 2,556,967 dated June 12, 1951.

The invention relates to hand-held roll-film cameras.

In order that the principle of the invention may be readily understood, I have disclosed a single embodiment thereof in the accompanying drawings, wherein—

Fig. 1 is a right-hand side elevation of the camera showing the view finder in erected position for making an exposure, the film rewind handle being shown in full lines in its normal position and the position thereof at fullest forward travel during film rewind being indicated in dotted lines;

Fig. 2 is a fragmentary top plan view of Fig. 1 clearly showing the position of the shutter setting dial or knob, the shutter being set for bulb exposure;

Fig. 3 is a developed view of the exposure setting dial scale;

Fig. 4 is a vertical section through Fig. 1 showing the construction of the cone mounting ring and the position of the focal plane shutter curtains, and, as the section extends through the camera magazine, clearly showing the construction of the latter;

Fig. 5 is a front elevation of Fig. 1, with the lens cone removed;

Fig. 6 is a fragmentary rear elevation of Fig. 1, clearly showing the exposure counter window;

Fig. 7 is a rear view of Fig. 1, with the camera door removed, and showing the film magazine in place;

Fig. 8 is a right-hand elevation of the magazine removed from the camera;

Fig. 9 is a front elevation of the magazine removed from the camera, the magazine being empty of film and therefore the pressure pad is clearly in view;

Figure 10:
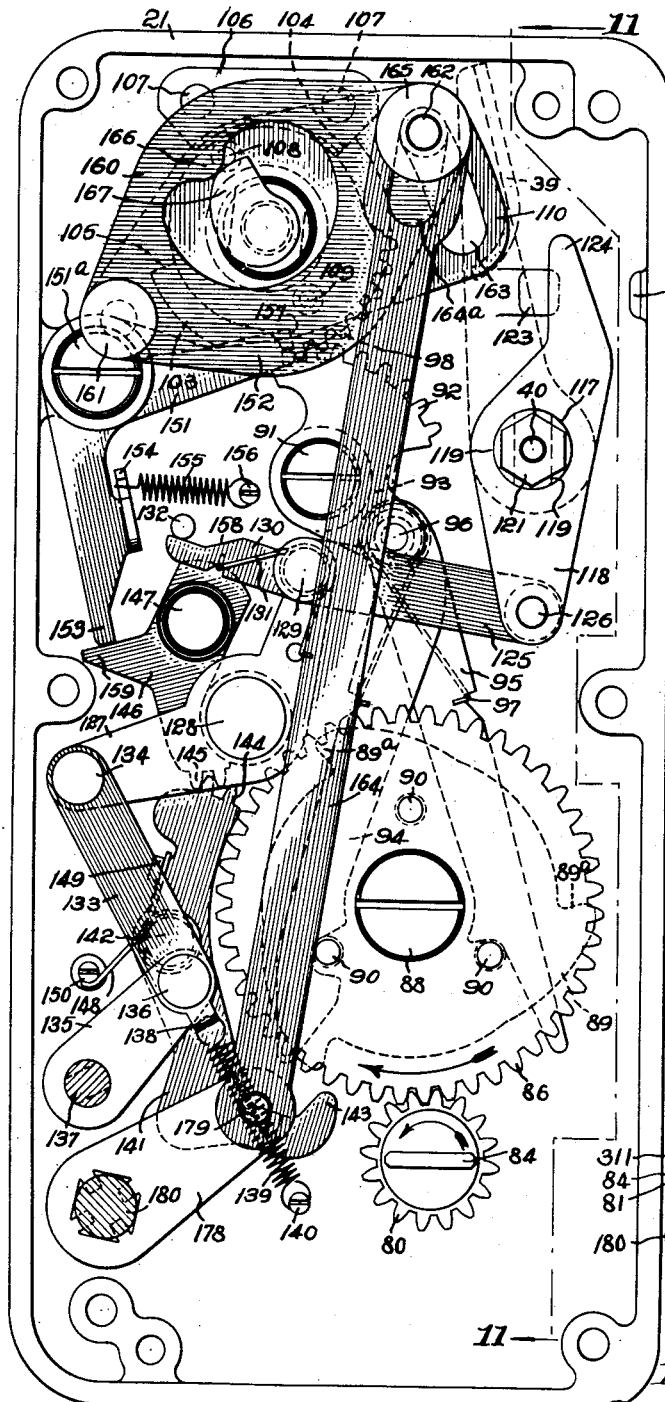
Figure 11:
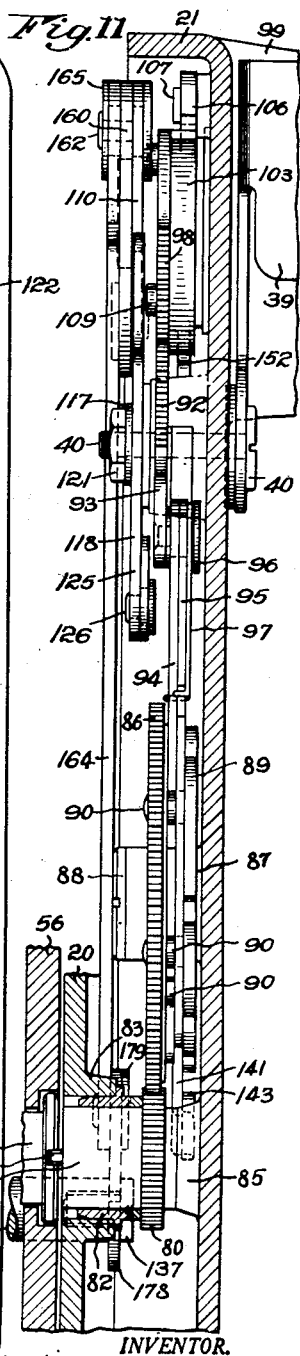
Figures 16, 17:
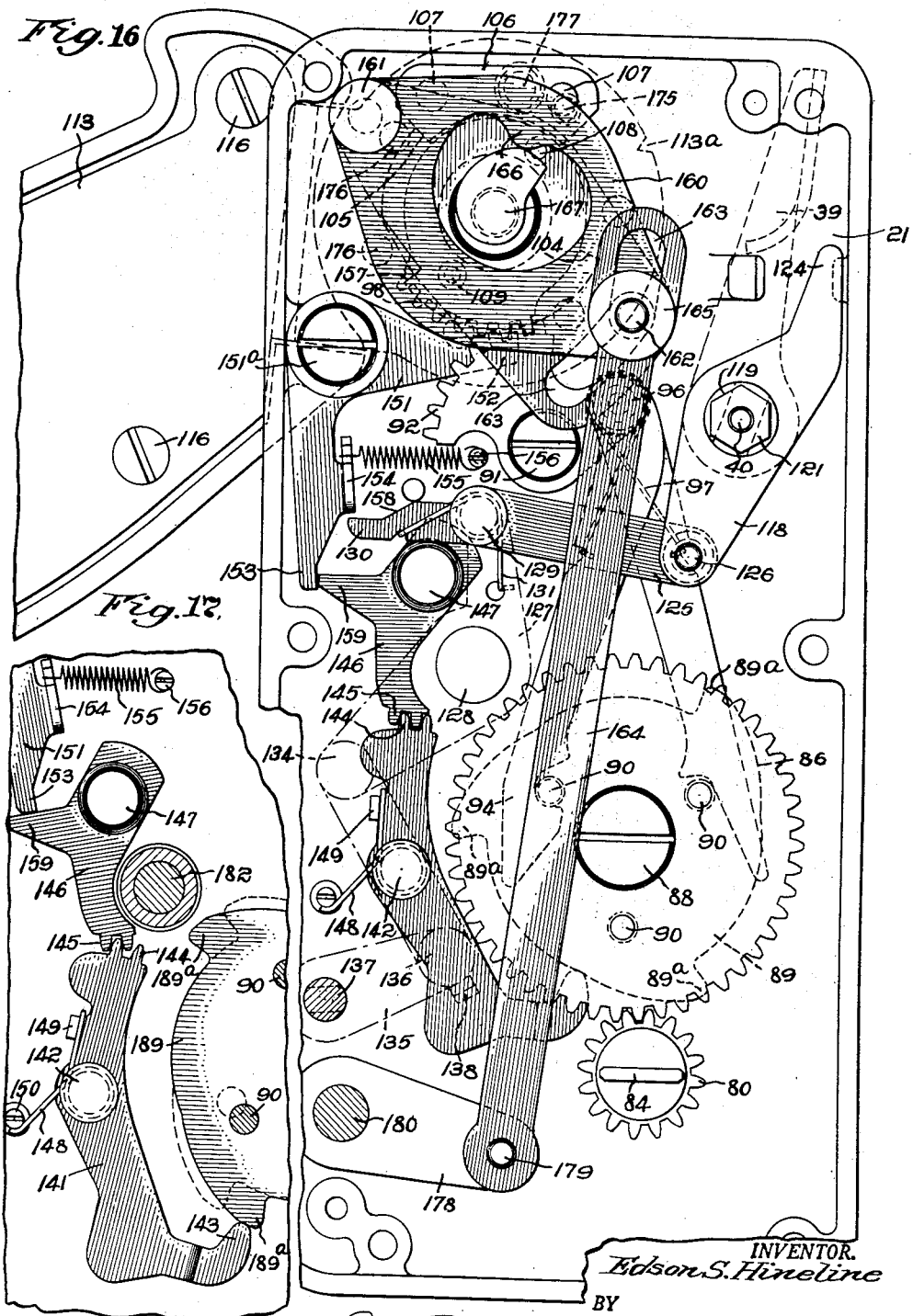
Figure 26:
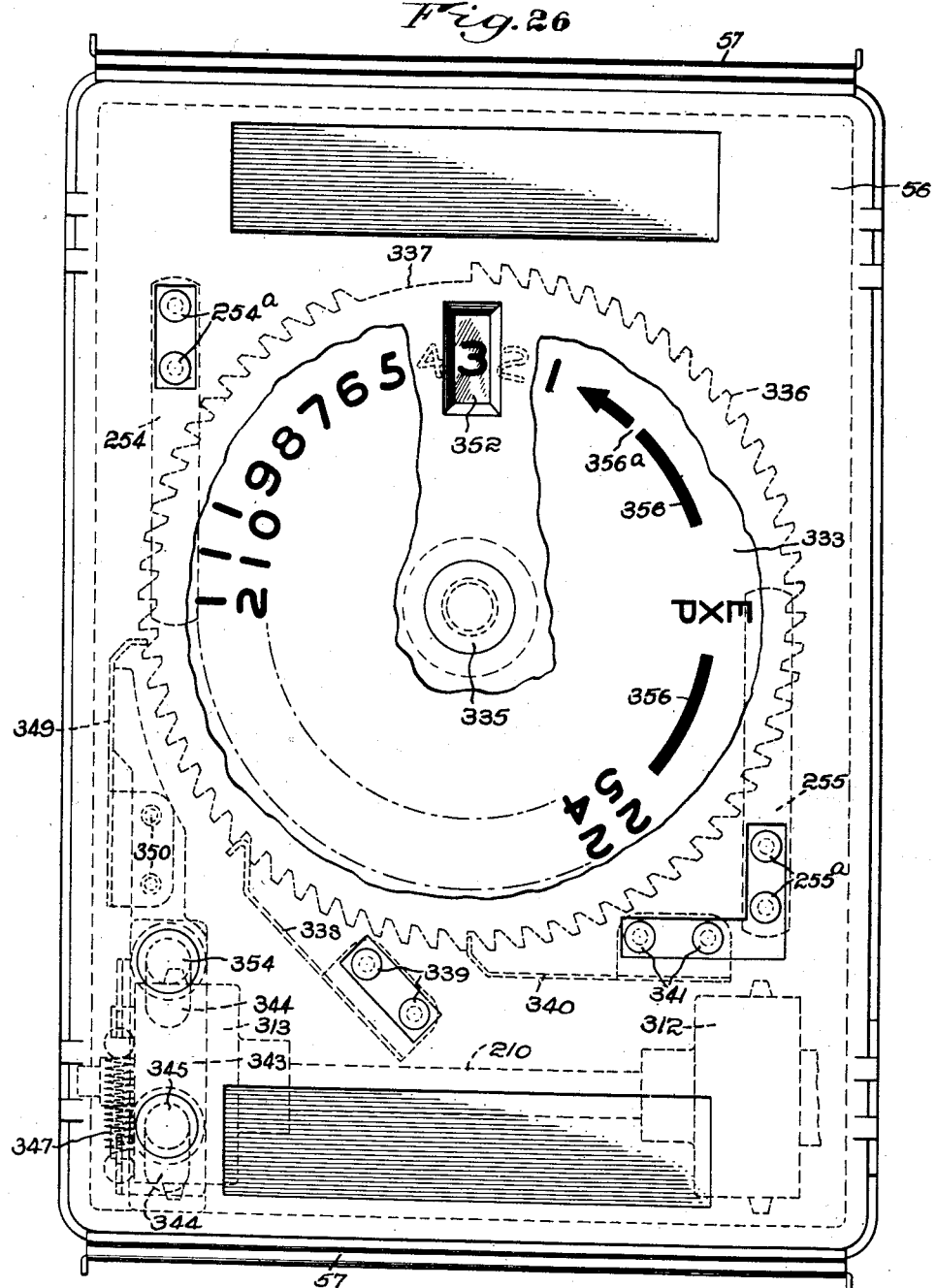

Fig. 10 is a view of the right-hand side of the camera, having the mechanism cover plate removed, to show most clearly the film rewind mechanism, the shutter setting mechanism, and the interlock mechanism for the film rewind mechanism, the entire mechanism being shown in the condition wherein the shutter release lever has been operated, thus releasing the shutter, shown in its run-down condition, the interlock being shown as partially operated, but not to be fully operated until the shutter release lever returns to its normal position, the shutter speed setting cam being shown in condition for bulb exposure;

Fig. 11 is a vertical section through Fig. 10, taken on the line 11—11 thereof, and showing the position of the several parts;

Fig. 12 is a view similar to Fig. 10, but showing the shutter release lever as having been partially returned to its normal position, and wherein a further movement of the release lever from the position shown to the normal position will leave the interlock mechanism in the unlocked condition, thus permitting operation of the shutter rewind handle to prepare the camera for a second exposure;

Fig. 13 is a transverse section through Fig. 19 on the line 13—13 thereof;

Fig. 14 is a transverse section through Fig. 19, taken on the line 14—14 thereof;

Fig. 15 is a fragmentary top plan view, partly in section, of the rewind handle shaft and the shutter rewind adjusting plates;

Fig. 16 is a view similar to Fig. 12, but showing the operating handle in its completely forward position, the shutter being in the set condition and the film having been partially fed for the next exposure;

Fig. 17 is a detail plan view showing part of the interlock mechanism as positioned just before the complete rewind of the film;

Fig. 18 is a view similar to Fig. 12, with some of the parts removed, showing the shutter in rewound condition, but with the shutter speeds set for an instantaneous exposure;

Fig. 19 is a vertical section through Fig. 18 on the line 19—19 thereof;

Fig. 20 is a detail of the film rewinding handle shaft;

Fig. 21 is a rear view of the inner structure of the magazine, the magazine case being shown in dotted lines;

Fig. 22 is a right-hand end view of the film magazine in elevation;

Fig. 23 is a vertical section through Fig. 21, taken on the line 23—23 thereof, so as most clearly to show the construction thereof;

Fig. 24 is a left-hand end view of the camera magazine in elevation;

Fig. 25 is a detail in vertical section of the film sprocket and clutch mechanism; and Fig. 26 is a rear view in elevation of the camera magazine, part of the cover being broken away to show the film exposure counting mechanism.

This invention relates to hand-held cameras of novel construction. The camera is of a very compact, dust-tight and moisture-proof construction enabling it to be used under severe operating conditions as, for instance, at the front line of modern warfare, and for that reason it is usually referred to as the "front-line camera." The camera is provided with an adjustable exposure-aperture focal plane shutter having very simple means for controlling shutter speeds. The camera is also provided with a removable lens cone for the ready interchange of lenses. The view finder is of novel construction. One element of such view finder is carried by the lens cone and, since the proportions of that element of the view finder can be changed to indicate the field covered by the particular lens carried in that cone, the act of changing cones also provides the proper view finder element for use with that lens and cone. The camera is provided with a handle that is also the operating means for rewinding the shutter and advancing the film, and an interlock mechanism is provided for locking the handle in place after the shutter has been rewound and until an exposure has been made, at which time the handle cannot again be operated until the next cycle.

The camera is provided with an interchangeable magazine of very simple construction and of a type that can readily be removed from the camera or be replaced in total darkness. The compact structure is such that the camera can be operated for making separate pictures in very rapid sequence. In fact, the camera has in practice been operated to make separate, non-moving pictures at the rate of two per second.

Among the objects of this invention, as covered by this divisional application B, are the following; to provide a compact, dust-tight, moisture-proof, camera body; to provide a camera having a single means for rewinding the shutter and advancing the film; to provide a camera having interlocking means so that the camera can be operated only in a proper sequence, thus preventing double exposures, blanks and lapses; to provide interlocking means that make it necessary to operate the film rewind and shutter setting handle throughout its full stroke in both directions before a new exposure can be made, such interlocking means locking the handle in its non-operating condition until after an exposure has been completed; to provide film feeding means operated by the shutter rewinding means and that is positive in its action; to provide an interchangeable magazine for a camera that can be removed and replaced in the camera with a minimum effort on the part of the operator and so simple in its operation that the change can be made in total darkness; to provide a magazine for the camera having a positive film feed mechanism with a pressure pad or plate to hold the film in exact register with the focal plane during exposure; and to provide a camera having a film magazine wherein the exposure counter is an integral part of the magazine, whereby the remaining number of exposures can be determined, whether or not the magazine is in the camera or is removed therefrom.

Referring first to Figs. 1, 2, 5 and 6, the camera body indicated at 20 is substantially rectangular in cross section, and to it is attached a right-side cover plate 21 housing the film feed mechanism, which is held to the camera body 20 by screws 22, 22, Fig. 1. On the opposite side of the camera body 20, as indicated in Fig. 5, is a left-side cover plate 23 housing the shutter control mechanism and hedl to the camera body 20 by a number of suitable screws (not shown). Fastened to the cover plate 23 is a carrying handle 24. To the front of the camera body 20 a lens cone 25 is attached by means of a lock ring 26 threaded onto a flange 27, and securely holding the cone 25 to the camera body 20. On the right-hand end of the cone 25, viewing Fig. 1, is a lens mount 28 having the usual focusing ring 29 and a diaphragm control ring 30.

Also attached to the camera body 20, as indicated at 31 is one element of a sight or view finder. To the cone 25, and specifically to bosses 32 carried by the cone, is attached the front element of the sight or view finder, generally indicated at 33, made up of an upper U-shaped member 34 and two telescopic members 35, one only being shown. The said telescopic members 35 are provided with an elongated slot 36, in which slides a shoulder rivet 37. The lower end of the telescopic member 35 is pivoted on a pin 38 fitted into the boss 32 of the lens cone 25. The said U-shaped member 34 of the sight or view finder can be collapsed into the telescopic members 35 and folded down onto the lens cone 25 for compactness and portability.

Attached to the cover plate 21 is a shutter release member 39 that is pivoted on a shaft passing through the wall of the cover plate 21 and held thereto by a screw 40. Also attached to the cover plate 21 is a shutter setting knob 41 fitted to a shaft passing through a suitable bearing in the cover plate 21, and carrying an operating handle 42.

Fitted to the back of the camera, best shown in Fig. 6, is a back member or door, indicated at 43, provided with an upper hinge member 44 and a lower hinge member 45, shown in Figs. 1 and 2. The hinge members used hereon are of the type that permit the door to be pivoted on either hinge member 44 or 45, or the door may be entirely removed. The structure is fully shown in the United States patent to Whitman and Nadel, No. 2,273,455, dated February 17, 1942, and needs no further description here. The camera back 43 is provided with a window 46 for viewing the exposure number.

Fig. 4, being a vertical cross section through the camera, most clearly shows the position of the magazine and also the curtain rollers. There is provided a vertical partition in the camera, indicated at 47, having the upper end bent over to the left, through which pass screws 48, 48, and these in turn are threaded into a retaining member 49. The lower end of the partition plate or member 47 is also provided with a left-hand extending member, through which passes a screw 50 into a retainer plate 51. The screws 48 and 50 also serve to hold to the camera body the hinge members 44 and 45 respectively.

Also attached to the bottom side of the camera body 20 is a tripod socket flange member 52 by means of screws 53, 53. The partition plate or member 47 is provided with an opening, into which a projecting member 54 of the magazine lower casting 55 is fitted. The magazine is made up of two castings, namely, the lower or forward one 55 and the upper or rearward one 56. The said castings 55 and 56 are held together by spring clips 57, 57. The camera magazine made up of the castings 55 and 56 is held in place in the camera by springs 58 and 59 held to the camera back 43 by rivets 60 and 61 respectively. A more complete description of the magazine will be given at a later point.

Still referring to Fig. 4, the second shutter curtain is indicated at 62 and is wound on a rewind spool 63 provided with a shaft 64. The first curtain is indicated at 65, and is provided with a rewind spool 66 having a shaft 67. The lower end of the second curtain 62 is provided with a second or take-up spool 68 having a shaft 69. The lower end of the first curtain 65 is provided with a take-up spool 70 having a shaft 71. These shutter curtains and their respective spools will be again referred to when describing the operation of the shutter.

As shown in Fig. 4, the lens cone 24 is provided with a forwardly extending cylindrical member 72 held to the lens cone 24 by rivets 73, 73. The cylindrical member 72 is provided with a groove 74 into which is fitted a ring 75, itself attached to the cone locking nut 26 by screws 76, 76. The flange 27 (Figs. 1 and 4) is held to the camera body 20 by screws 77, 77, and is provided with a locking pin 78 engaging a hole 79 of the cylindrical cone member 72. The cone 24 is attached to the camera body 20 by the threaded clamp nut 26 that is threaded to the flange 27 and tightened in the usual manner. The right-side cover plate 21 of the camera body constitutes a mechanism housing for the film rewind mechanism and also for the shutter speed setting and rewind mechanism.

Referring now to Figs. 10 to 20, a film rewind pinion is shown at 80 and is provided with a shaft 81 fitted into a bushing 82 carried in a boss 83 in the camera body 20. The said shaft 81 is provided with a key 84 engaging a driving dog in the film magazine to be later referred to more fully. The pinion 80 and the shaft 81 are held in position by a boss 85 cast integral with the camera cover plate 21. Said pinion 80 meshes with a large gear 86 carried on a suitable stud fitted into a boss 87 cast integral with the said cover plate 21. A retaining screw 88 is threaded into said boss and holds the gear 86 in place.

Attached to the under side of the gear 86, viewing Fig. 10, is a cam plate 89 having peripheral cams 89a (Fig. 17, clearly shown in dotted lines) which is separated from and securely held to the said gear 86 by means of studs 90 and which also serve as a ratchet for advancing the gear 86 in a clockwise direction in a manner now to be described.

Attached to the right side cover plate 21 by a suitable shoulder screw 91 is a gear sector 92 having, as shown in Figs. 10 and 12, in arm 93 extending to the right, and thereto are attached ratchet drive members 94, 95, Figs. 10 and 12, by a suitable shoulder rivet 96. The ratchet drive members 94 and 95 are caused to move inwardly towards the center of the gear 86 by means of a spring 97 fitted around the shoulder rivet 96 and engaging suitable notches in the ratchet drive members 94 and 95. The said gear sector 92 meshes with a second gear sector 98, shown in dotted lines in Figs. 10, 12, 16 and 18, in section in Fig. 19, and in solid lines in Fig. 11.

Referring now to Fig. 19, said right-side cover plate 21 is provided with a boss 99 extending to the right, into which are fitted bushings 100 and 101, and fitted thereinto is a shaft 102, shown in detail in Fig. 20. The left-hand end of the shaft 102 is provided with an enlarged cylindrical flange 103, which has part of its periphery cut away, as most clearly shown in dotted lines in Figs. 10, 12 and 18. The ends of said cut-away portion form limiting stops 104 and 105 that co-act with a stop plate 106 to limit the motion of the shaft 102 in either direction. Said stop plate 106 is held to the said right-side cover plate 21 by rivets 107, 107. The gear sector 98 is attached to the flange 103 and the shaft 102 by drive pins 108, 108 which are provided with large diameter sections 109, 109 that serve as a spacer between gear sector 98 and a shutter rewind plate 110 fitted over an extension 111 of the shaft 102 and caused to rotate with said shaft 102 by means of said pins 108. The function of said shutter rewind plate 110 will be explained presently. The right-hand end of the shaft 102 is provided with milled flats 112 over which is fitted a handle support member 113, Fig. 16, and held thereto by a nut 114 threaded to an extension 115 of the shaft 102. The operating handle 42 is securely attached to the handle support member 113 by screws 116. Any motion of said handle 42 will be transmitted to the gear sector 98 through the shaft 102, the flange 103 and the pins 108.

Again referring to Fig. 10, as the gear sector 98 is caused to rock to and from through the movement of the handle 42, the gear sector 92 and the arm 93 thereof will also be caused to rotate. When said gear sector 92 rotates in a contraclockwise direction, the ratchet member 94 will be moved in an upward direction, causing the gear 86 to be turned in a clockwise direction because of the ratchet pins 90. When the operating handle 42 is moved all the way forward into the position shown in dotted lines in Fig. 1, the gear sector 92 and the ratchet drive members 94, 95 will be in the position shown in Fig. 16. It will be noted that one of the pins 90 has been moved in a clockwise direction by the ratchet drive member 94, and the ratchet drive member 95 will also be moved in an upward direction to engage another of the ratchet pins 90. As the operating handle 42 is returned to its normal position, the gear sector 92 will be caused to move in a clockwise direction, the ratchet drive members 94 and 95 will be caused to move in a downward direction, and the ratchet drive member 95 will engage one of the pins 90, causing the gear 86 to be rotated in a clockwise direction. The ratchet drive member 94 will also be moved in a downward direction, but will become disengaged from the pin 90 and the parts will be returned to the position shown in Fig. 10. Through the described cycle of operation, the gear 86 will have turned one third of a revolution and the pinion 80 will have turned one complete revolution. The forward and backward movement of the operating handle 42 is limited in its motion by the stop plate 106 and the stops 104 and 105.

There is provided by this invention an interlocking means whereby, after the operating handle 42 has completed a cycle (i. e. a forward movement and a return movement), it is automatically locked and cannot then again be operated until an exposure has been made. In the past there have been interlocks that prevented the operation of the rewinding member until after the shutter trip lever has been pressed. This is quite satisfactory when a winding knob is used and the knob is not used for the support of the camera. In operating the camera herein disclosed, the operating handle 42 becomes one of the supports for holding the camera, and, if it were unlocked the instant the shutter release lever 39 became depressed, the camera would move, thus spoiling a picture. The present invention provides an interlocking means whereby the operating handle 42 is kept in a locked condition until the shutter release lever 39 is allowed to return to its normal position after making an exposure. Therefore, the operating handle 42 is kept locked until after the exposure has actually been made.

To the right-side cover plate 21 is fixed a boss, through which passes a shaft 117, Fig. 11, to the right-hand end of which is attached the said shutter release lever 39. To the opposite or left-hand end of the shaft 117 is attached a second lever 118, shown in side elevation in Fig. 10. The said shaft 117 is provided with suitable flats 119 to key the said shutter release lever 39 and the lever 118. Passing through the shaft 117 is the large head screw 40, the opposite end of which is provided with a nut 121, thus clamping the assembly together and causing the shutter release lever 39 and the lever 118 to be locked securely together and to be free to rotate in the boss of the right-side cover plate 21. The motion of the lever 118 is limited by stops 122 and 123, integral with said right-side cover plate 21, engaging a terminal finger 124 of the lever 118 when it reaches the limit of its travel in either direction. To the lower end of the lever 118 is attached a connecting link 125 by means of a shoulder rivet 126.

To the left-hand end of the connecting link 125, viewing Fig. 10, is attached a bell crank 127 pivoted on a shoulder rivet 128. The connecting link 125 is connected to the bell crank 127 by a shoulder rivet 129. Also pivoted on the shoulder rivet 129 is a floating dog 130, the function of which will be subsequently explained, and which is caused to be turned in a clockwise direction by means of a spring 131, but limited in its motion by a pin 132. To the lower end of the bell crank 127 a second connecting link 133 is attached by a shoulder rivet 134. To the lower end of the said connecting link 133 a lever 135 is attached by means of a shoulder rivet 136, said lever 135 being securely attached to a shaft 137 that passes through the camera body to the shutter mechanism on the opposite side thereof, where it is mounted on the left side cover plate 23. Upon the extreme lower end of the connecting link 133 is formed an upturned end 138, to which is attached a coiled spring 139, the lower end whereof is attached to a pin 140 threaded into the right-side cover plate 21. The said spring 139 tends to rotate the lever 135 in a clockwise direction, the bell crank 127 in a contraclockwise direction. and the shutter release lever 39 in a clockwise direction. When said shutter release lever 39 is operated in a clockwise direction, viewing Fig. 1, the lever 135 and the shaft 137 will be operated in a contraclockwise direction, viewing Fig. 10, thus releasing the shutter.

A lever 141 is also attached to said right-side cover plate 21 by means of a shoulder rivet 142. The lower end of said lever 141 is provided with a cam follower or dog 143 that engages the cam plate 89. The upper end of said lever 141 is provided with gear teeth 144 that mesh with similar gear teeth 145 of a latch or interlock member 146 pivoted on a shoulder screw 147 to the said cover plate 21. The lever 141 is caused to rotate in a contraclockwise direction by a spring 148, one end of which engages an upturned ear 149 of said lever 141, the opposite end thereof engaging a pin 150 threaded into said cover plate 21. A bell crank 151 is also attached to said cover plate 21 by means of a shoulder screw 151a. One end of said bell crank 151 is provided with a finger 152, and the opposite end is provided with a finger 153 and an upturned member 154. The said bell crank 151 is caused to rotate in a contraclockwise direction by means of a coiled spring 155, one end of which is connected to the upturned member 154 and the opposite end to a pin 156 threaded into the said right-side cover plate 21. The enlarged flange 103 of the shaft 102, previously referred to, is provided with a notch 157 that is engaged by the said finger 152 when the camera is in the rewound condition, as shown in Fig. 10.

When the camera is in condition for making an exposure, the rewind mechanism will be in the position shown in Figs. 10 and 12. In Fig. 10, the shutter release lever 39 is shown as moved forward to the left, that is, in a clockwise direction viewing Fig. 1. The lever 118 will be rotated in a contraclockwise direction viewing Fig. 10, thereby moving the connecting link 125 and the floating dog 130 in a righthand direction, viewing Fig. 10. The said floating dog 130 will be moved along the pin 132, it being allowed to move in an upward direction because of the cam face 158 and the spring 131.

It will be noted that the finger 152 of the bell crank 151 still engages the notch 157 of the flange 103. Therefore, the operating handle 42 cannot yet be moved, but as the shutter release lever 39 is released, the lever 118 will be caused to rotate in a clockwise direction, because of the spring 139, causing the bell crank 127 to be rotated in a contraclockwise direction, and the connecting link 125 and the floating dog 130 to be moved in a left-hand direction, viewing Fig. 10. The said floating dog 130 will engage the upturned member 154 of the bell crank 151, rotating it in a clockwise direction, thus withdrawing finger 152 of the bell crank 151 from the notch 157 of the cylindrical flange 103, as shown in Fig. 12.

Just before the shutter release lever 39 reaches the end of its travel, the terminal finger 153 of the bell crank 151 moves past the end of the finger 159 of the latch or interlock member 146, allowing it to turn in a clockwise direction. At the same time, the cam face 158 of the floating dog 130 will be cammed down by the pin 132, thus withdrawing the floating dog 130 from engagement with the upturned member 154, and thus allowing the bell crank 151 to rotate slightly in a contraclockwise direction until the finger 153 of the bell crank 151 is engaged by the finger 159 of the latch or interlock member 146 which has turned in a clockwise direction because of spring 148, thus holding the finger 152 out of engagement with the notch 157 of the enlarged flange 103 of the shaft 102.

The operating handle 42 can now be moved in a forward direction, thus rotating the gear 86 in a clockwise direction as previously fully described. When the operating handle 42 reaches the end of its travel in a forward direction, the motion is reversed and said handle 42 is returned to its normal position. This motion will also rotate the gear 86 in a clockwise direction, carrying with it the cam plate 89 provided on its periphery with the cams 89a. Just before the operating or rewind handle 42 reaches the end of its travel in a return direction, one of the said cams 89a will contact with the dog 143 of the lever 141, Fig. 17, moving said lever 141 in a clockwise direction and the interlock or latch member 146 in a contraclockwise direction, thus withdrawing the finger 159 of the latch or interlock member 146 from the finger 153 of the bell crank 151, which latter will be caused to rotate in a contraclockwise direction because of the spring 155 carrying with it the finger 152, which will engage the notch 157 of the enlarged flange 103 of the shaft 102. The operating handle 42 will now be locked in position and cannot be again operated until the shutter release lever 39 has been operated and released, allowing said operating handle 42 to return to its normal position. The mechanism will now be in the position shown in Fig. 10.

There will next be described the mechanism carried by the right-side cover plate 21 for operating the shutter rewind mechanism, and reference will still be made particularly to Figs. 10 to 20.

Carried by the shutter rewind plate 110 is a cam plate 160 that is pivoted on said plate 110 by a shoulder rivet 161. The opposite end of said cam plate is guided by a shoulder rivet 162 that passes through an elongated arcuate opening 163 and into a hole provided therefor in the cam plate 160. A shutter rewind arm or bar 164 having an elongated opening 164a is attached to the rivet 162 by a bushing 165. The said cam plate 160 is provided with a lobe 166 that rides on a cam 167 attached to the shaft 168 which, as shown in Fig. 19, passes through the shaft 102. Fitted to the shaft 168 is a spline sleeve 169 held thereto by a pin 170, shown also in Fig. 13. Fitted over said spline sleeve 169 is the shutter setting knob 41. The shaft 168 is provided with a threaded extension 171, over which is fitted a spring retaining plate 172 held to the shaft 168 by a nut 173.

In a space provided therefor in the shutter setting knob 41 is a coiled spring 174, which causes said shutter setting knob 41 to be forced in a left-hand direction, viewing Fig. 19, because of the spring retaining plate 172. The said shutter setting knob 41 carries a dowel pin 175 that engages any one of a series of holes 176, 176 in the handle support member 113, shown in Fig. 14. Also carried by said handle support member 113 is a pin 177 that serves as a stop for the dowel pin 175 when it reaches the end of its travel in either direction.

The lower end of the shutter rewind arm 164 is pivoted to a lever 178 by means of a shoulder rivet 179, as shown in Figs. 10, 12, 16 and 18. The said lever 178 is attached to a shaft 180 passing through the camera wall and the camera body itself to the opposite side.

The construction and operation of the film magazine in its cooperation with the camera mechanism will now be described, and for that purpose reference will be particularly made to Figs. 4, 7 to 11, and 21 to 26.

In Figs. 8 and 9, the film magazine is shown in side and front elevation as made up of an outer casing consisting of the front casing member 55 and the rear casing member 56 held together by the spring clips 57, 57. The film magazine case can be readily separated by removing spring clips 57 and lifting off the rear casing member 56.

As shown in Fig. 21, the magazine contains a film supporting and measuring mechanism made up of a frame consisting of a bottom plate 290 that serves also as a pressure pad and referred to as such. To the right-hand end of such pressure pad is formed a right-hand side plate or member 291, best shown in Fig. 22, and to the left-hand side of said pressure pad 290 is formed a left side plate or member 292, best shown in Fig. 24. Between said side members 291 and 292 is fitted an idler roller 293 mounted on suitable pins 294, 294. To said right-hand side member 291 are fitted film-spool mounting pins 295, 296 respectively. Referring to Figs. 21 to 24, between the side members or plates 291 and 292 is fitted a cross member 297 having right-angle formations 298, 298 attached to the pressure pad 290 in any suitable manner, such as spot welding. On the opposite side of the cross member 297 is formed a gusset plate 299 which is also attached to the pressure pad 290. The left-hand end of said cross member 297 constitutes one part of a hinge member, indicated at 300, to which are attached the film spool support members 301, 302, the former being provided with a film-spool mounting pin 303 and the latter with a film-spool mounting pin 304. The said hinge members 301 and 302 are so formed that, when in a closed condition, they lie flush with the side member 292, and they are held in that position by a coiled spring 300a. When the film carrier is removed from the magazine housing, the hinge members 301 and 302 can be swung outwardly to facilitate the removal of the film spools 305 and 306 respectively. A film spool 305 is carried on the pins 295 and 303, and a spool 306 is carried on the pins 296 and 304. The said spools 305 and 306 are of conventional construction excepting that the spool 306 is provided with a spur gear 307 for driving the take-up spool, which in this embodiment of the invention is the said spool 306. To the pressure pad or bottom plate 290, as shown in Fig. 21, a supply spool pressure spring 308 and a take-up spool pressure spring 309 are fastened by means of rivets 309a, 309a. These springs are for the purpose of preventing the film from unwinding from the supply spool 305 and of providing sufficient tension to hold the film taut when in the magazine.

As shown in Figs. 21 and 25, the lower end of the spool carrier structure is provided with a film drive sprocket made up of a shaft 310 having a driving flange or dog 311, and attached to the shaft 310 is a clutch sprocket member or wheel 312, Figs. 23 and 25, and a counter sprocket wheel 313 fastened to the shaft 310 in any suitable manner, as by a pin 314. The shaft 310 is fitted into suitable holes in the side members or plates 291 and 292. The clutch sprocket member 312 constitutes means to drive a main take-up gear 315. The inner wall of the clutch sprocket member 312 is provided with grooves 316, 316, and to the shaft 310 is fitted a bushing 317 free to rotate on the shaft 310, and fitted over said bushing 317 is an inner clutch drive member 318 having grooves or notches 319, 319. To one end of said inner clutch drive member 318 is fitted the gear 315, and to the opposite end thereof is fixed a clutch plate 320.

Fitted over the inner clutch drive member 318 are movable clutch plates 321, 321, and between said movable clutch plates 321 and the clutch plate 320 are clutch plates 322, 322. Between the right-hand clutch plate 321 and said main take-up gear 315 are a series of coiled springs 323 that provide pressure on the clutch plates 321 and 322. The clutch plates 321 are provided with lobes 324 that engage the grooves or notches 319 of the inner clutch drive member 318, and the clutch plates 322 are provided with lobes 325 that engage the grooves 316 of the sprocket wheel 312.

As the shaft 310 is turned by the driving flange or dog 311, the take-up gear 315 in the inner clutch drive member 318 will tend to turn with shaft 310, but if the take-up gear 315 is held from further movement, the shaft 310 and the clutch sprocket 312 can continue to rotate, due to the frictional arrangement of clutch plates 320, 321 and 322. This construction is necessary because while the shaft 310 always makes one complete revolution in each film feeding movement, the take-up spool 306 will turn only sufficiently far to wind up the film fed to it by the sprocket members or wheels 312 and 313, and since the film spool 306 increases in diameter as more film is wound thereon, the film spool 306 will turn through a slightly diminishing extent of rotation each time the shaft 310 makes a complete revolution.

The clutch sprocket member or wheel 312 is provided with a notch 326 shown in dotted lines, Fig. 23, that is engaged by a flat spring 327, itself attached to the pressure pad 299 by rivets 328, 328. Such notch and spring serve as means for locking the position of the clutch sprocket member or wheel 312 and the driving flange or dog 311 when the magazine is loaded, and this will be further referred to in describing the function of the film counter. The film take-up spool 306 is driven by means of idler gears 329, 330, shown in dotted lines, Fig. 22, and respectively carried on a stud 331 and a stud 332, both attached to the film carrier right-side member 291.

The counter dial mechanism will next be described, reference being made to Figs. 4 and 26. Therein, to the magazine cover member 56 is attached a counter dial 333 provided with a bushing 334 held to said magazine cover member 56 by a shoulder rivet 335. The bushing 334 is held securely to the magazine cover member 56, but the dial 333 is free to rotate on said bushing 334. The counter dial 333 is provided with a series of teeth 336 which extend substantially all the way around the periphery thereof. There is, however, one section 337 of the counter dial 333 that does not have any teeth, and the reason therefor will be presently explained.

To the magazine cover member 56 a spring pawl 338 is attached by rivets 339, 339, and a second spring pawl 340 is attached by rivets 341, 341. Said pawls 338 and 340 are to prevent a contra-clockwise rotation of the counter disk 333, viewing Fig. 26.

As shown in Figs. 4, 21 and 26, the counter sprocket wheel 313 is provided with two oppositely spaced pins 342, 342. Attached to the rear casing member 56 of the magazine is a sliding member 343 that is provided with elongated openings 344, which is held to the said rear casing member 56 by shoulder rivets 345, 345. Said sliding member 343 has a downwardly extending finger 346, Fig. 4, that engages the pins 342 of the said sprocket member or wheel 313. The said sliding member 343 is caused to move in a left-hand direction, viewing Fig. 4, by a coiled spring 347, one end of which engages a hole in the downwardly extending finger 346, and the opposite end of which engages a bracket 348 provided for that purpose. To the sliding member 343, as best shown in dotted lines in Fig. 26, a spring pawl 349 is attached by rivets 350, 350, which pawl engages teeth 336 of the counter dial 333.

Each time the shaft 310 makes a 180° rotation, it advances said counter dial 333 a distance of one tooth for each 180° rotation and two teeth for each complete revolution. The teeth 336 are so spaced that each two teeth are the equivalent of the spacing of the film numbers, which can be viewed through an opening 351 in the back of the magazine cover member 56, said opening being provided with a filter 352 to exclude actinic light from the magazine compartment. The camera cover plate 43 is also provided with the window 46 so that the film number can be viewed in the magazine without opening the back of the camera.

Referring to Figs. 21 to 24, the magazine is loaded by first disengaging the magazine clips 57, 57, separating the magazine cover members 56 and 55, and then lifting out the film carrier. A supply spool of unexposed film 353 is placed in the position of the spool 305 in Fig. 23. Said film strip is carried around the idler roll 293, over the pressure pad 299, around the sprocket members 312 and 313 and onto the take-up spool 306, a sufficient amount of film being wound onto the take-up spool 306 to hold the film 353 in place. The film sprocket member 312 is then advanced until the notch 326 is engaged by the spring 327. This will hold the sprocket member 312 in position so that the slotted opening 311a of the driving flange or dog 311 will be in a vertical position, viewing Fig. 22.

The spool carrier is then placed in the lower half of the film magazine 355 and the magazine cover member 56 is put in place and held there by the spring clips 57, 57. The film strip 353 will be held in contact with the magazine aperture by the pressure pad 299 as the springs 254 and 255, Figs. 4 and 26, are attached to the magazine cover member 56 by rivets 254a, 254a and 255a, 255a respectively. The springs 254 and 255 exert a downward pressure on the cross member 297 of the spool carrier, thus forcing the pressure pad 299 into contact with the film strip 353. The film magazine 355 is now ready to be placed in the camera, the camera door 43 is opened and the film magazine 355 is dropped into place. The slot 311a of the driving flange or dog 311 will be engaged by the key 84 of the gear hub 81, as shown in Fig. 11.

Referring to Fig. 26, each time that the camera operating handle 43 is caused to make a complete cycle, the driving flange or dog 311 will be caused to make one complete revolution, thus driving the sprocket wheels 312 and 313 one revolution. As the sprocket member 313 makes a complete revolution, the spring pawl 349 will be oscillated twice, advancing the counter dial 333 a distance equivalent to one numeral.

Before the magazine cover 56 was put in place, the counter dial 333 was set so that the break in the arrow 356, indicated at 356a, will be positioned under the filter 352 when the film magazine 355 is placed in the camera. The operating handle 42 is manipulated until the numeral "1" appears under the filter 352, at which time the film strip 353 will be in position for making the first exposure. After the 25th exposure is made, the arrow 356 will again appear through the filter 352, telling the operator that all the exposures have been made. The continued manipulation of the operating handle 42 will advance the letters "EXP" in position under the filter 352, telling the operator that a sufficient amount of film 351 has been wound on the take-up spool 306 to make it light-tight. Any further manipulation of the operating handle 42 of the camera will not cause the counter dial 333 to be further advanced because of the absence of teeth 336 at the space 337, previously referred to. Therefore, the spring pawl 349 will not operate the counter dial 333, which will remain in the position wherein "EXP" remains under the filter 342.

The film feeding means, the shutter releasing means and the shutter rewinding means herein disclosed are all intimately associated in action and are operatively connected to the operating handle 42 and to the interlock means. By the herein disclosed invention there are provided film feeding means, a shutter, shutter releasing means, shutter rewinding means, an operating handle operatively connected both to the film feeding means and to the shutter rewinding means, and an interlock operatively connected to the said operating handle and thereby caused to lock the said operating handle in place after the shutter has been rewound by said operating handle and until an exposure has been made by the shutter whereby the said operating handle cannot again be operated to feed the film or to rewind the shutter until the next cycle of camera operations.

In this Division B the shutter mechanism is not disclosed in detail, being disclosed in and claimed in my said application Ser. No. 689,714.

This invention is clearly distinguished from that disclosed in United States Patent No. 2,362,813, November 14, 1944, wherein I am one of the joint inventors. In that patent, which is concerned with aerial photography, and as fully described on page 11 of the specification thereof, the operating handle 39 is first turned in one direction to feed the film for the next exposure and to rewind the single curtain constituting the shutter. The handle 39 is then returned to its former position and immediately becomes locked in that position and cannot be operated until after the shutter has been released. As soon as the operating handle 39 becomes so locked, the shutter release lever 40 can be operated for releasing the shutter which thereupon runs down, the capping gates having been duly opened. The running down act of the single curtain unlocks the shutter operating handle 39 and locks the release lever 40.

In the present invention there is provided a shutter release lever but no interlock especially therefor, as is provided for the shutter release lever 40 in said patent. In the present invention the operating handle 42 becomes automatically locked immediately after having made a forward movement and a return movement and cannot again be operated until an exposure has been made. The said operating handle 43 is kept locked until the shutter release lever 39 has returned to its normal position after the exposure has actualy been made.

It is believed that everything herein claimed is properly claimable in this application, Division B, inasmuch as all the claims herein are directed to the film mechanism or parts thereof, in their entirety, or to the film mechanism and other elements so intimately co-acting therewith as to present legitimate novel combinations claimable in the same application with claims directed solely to the film mechanism.

Having thus described one illustrative embodiment of the invention, it is to be understood that although specific terms are employed, they are used in a generic and descriptive sense and not for purposes of limitation, the scope of the invention being set forth in the following claims.

I claim:

1. A camera having film advancing means including a film rewind pinion 80, a gear 86 meshing with the said pinion, a cam plate 89 attached to a face of the gear 86 and having driving studs 90, a gear sector 92 having an extending arm 93, and ratchet drive members 94, 95 pivotally attached to said arm 93 and adapted to engage said driving studs 90 of the cam plate 89, and means to impart rotary movement to said gear sector 92.

2. Film advancing means for a camera in accordance with claim 1, but wherein there is provided a second gear sector meshing with the first mentioned gear sector and a shaft about and co-axially with which said second sector is mounted, and having a flange with a cut-away portion providing two stops, said shaft having a back-and-forth turning movement, and means cooperating with said two stops to limit the motion of said shaft in either direction of back-and-forth movement.

3. Film advancing means for a camera in accordance with claim 1, but wherein there is provided a second gear sector meshing with the first mentioned gear sector, and a shaft about and co-axially with which said second sector is mounted, and a flange with a cut-away portion providing two stops, said shaft having a back-and-forth turning movement, and a stop plate cooperating with said two stops, thereby limiting the movement of the said shaft in either direction.

4. Film advancing means for a camera in accordance with claim 1, but wherein there is provided a second gear sector meshing with the said first mentioned gear sector, and a shaft having a back-and-forth turning movement, and about and co-axially with which said second gear sector is mounted, and which shaft has a flange provided with a notch, and means operative in said movement of said shaft to engage said notch to hold said shaft from turning movement.

5. Film advancing means for a camera in accordance with claim 1, but wherein there is provided a second gear sector meshing with the first mentioned gear sector, and a shaft about and co-axially with which said second sector is mounted.

6. Film advancing means for a camera in accordance with claim 1, but wherein there is provided a second gear sector meshing with the first mentioned gear sector, and a shaft having a back-and-forth turning movement, and about and co-axially with which said second sector is mounted, said shaft having a flange with a cut-away portion providing two stops, and wherein there is an operating handle supported about the shaft and operatively connected to said second gear sector by means of said shaft.

7. A camera having film advancing means including a film rewind pinion 80, a gear 86 meshing with the said pinion, means cooperating with the gear 86 and having driving studs 90, a gear sector 92, and ratchet drive members 94, 95 connected to said gear sector and adapted to engage said driving studs 90, and means to impart turning movement to said gear sector 92.

8. Film advancing means for a camera in accordance with claim 7, but wherein there is provided a second gear sector meshing with the first gear sector, and a shaft about and co-axial with which the said gear sector is mounted and having a back-and-forth turning movement for advancing the film and having a flange 103 with a cut-away portion providing two stops, and means to engage said stops to limit the movement of said shaft in either direction of turning movement.

9. Film advancing means for a camera in accordance with claim 7, but wherein there is provided a second gear sector meshing with the first gear sector, and a shaft about and co-axially with which the said second gear sector is mounted and having a back-and-forth turning movement for advancing the film and having a flange with a cut-away portion providing two stops, a stop plate supported adjacent said shaft and said stops, thereby limiting the movement of the shaft in either direction of turning movement.

10. Film advancing means for a camera in accordance with claim 7, but wherein there is provided a second gear sector meshing with the first gear sector, and a shaft about and co-axially with which said second gear sector is mounted and having a back-and-forth turning movement for advancing the film and having a flange provided with a notch, and means to engage said notch to hold said shaft from turning movement.

11. Film advancing means for a camera in accordance with claim 7, but wherein there is provided a second gear sector meshing with the first gear sector and a shaft having back-and-forth turning movement for advancing the film, and whereon said second gear sector is mounted.

12. Film advancing means for a camera in accordance with claim 7, but wherein there is provided a second gear sector meshing with the first gear sector, and a shaft about and co-axially with which said second gear sector is mounted and having a back-and-forth turning movement for advancing the film and having a flange with a cut-away portion providing two stops, and stop means supported adjacent said shaft to engage said stops, to limit the turning movement of said shaft in either direction, and wherein there is an operating handle supported about the shaft and operatively connected to said second gear sector by means of said shaft.

13. In a camera having film advancing means, a shutter release lever, a lever fast with said shutter release lever, a link connected to said lever, a bell crank lever pivotally connected to said link and having a floating dog, a second connecting link connected to said bell crank lever, a lever connected to said second connecting link, and spring means for moving said last mentioned lever in one direction.

14. Film feeding means for a camera in accordance with claim 13, but wherein there is a lever having a dog, and wherein there is provided a film rewind pinion, a gear meshing with said film rewind pinion, and a cam plate attached to a face of said gear, and wherein the said dog on the said lever is adapted to engage said cam plate to be moved thereby and thereby to cause said lever to move.

15. Film feeding means for a camera in accordance with claim 13, but wherein there is a lever having a dog, and wherein there is provided a film rewind pinion, a gear meshing with said rewind pinion, and a cam plate attached to a face of said gear, and wherein the said dog of the lever is adapted to engage said cam plate, to be moved thereby and thereby to cause said lever to move, and wherein said lever has gear teeth, and wherein there is a latch or interlock member having teeth engaging the teeth of the said lever.

16. Film feeding means for a camera in accordance with claim 13, but wherein there is a lever having a dog, and wherein there is provided a film rewind pinion, a gear meshing with said rewind pinion, and a cam plate attached to a face of said gear, and wherein the said dog of the said lever is adapted to engage said cam plate, to be moved thereby and thereby to cause said lever to move, and wherein said lever has gear teeth, and wherein there is a latch or interlock member having teeth engaging the teeth of the said lever, and wherein there is a shaft and a bell crank lever having an arm co-acting with said shaft, and having a finger to engage said latch or interlock member.

17. A camera of the hand-carried type having a box-like body portion substantially rectangular in cross section, and having a door at the back thereof, two opposite side cover plates secured at opposite sides of the body portion to constitute the sides of the camera, film feed mechanism mounted within said body portion upon the inner face of one of said side cover plates, a fully enclosed film feed magazine or casing received within the said camera body portion and removable as a unit through the back of said box-like body, and operatively connected to but readily separable from said film feed mechanism, the said camera having mounted upon the outside of one of said side cover plates thereof a prolonged, non-rotary, camera-carrying, pivoted handle movable back and forth for operating at least the film feed mechanism, said removable film feed casing comprising a bottom plate 290 constituting also a pressure pad for the film when said structure is in functioning position in the camera with the film in position for an exposure; two opposite side members 291, 292 upstanding from said bottom plate, said side member 291 having film spool supporting pins 295, 296, an intermediate cross member 297 attached to and upstanding from said bottom plate, an idler roller, 93 and clutch wheel means both directly supported in said side members 291, 292 near opposite ends of said structure, two plate members 301, 302 oppositely hinged to said cross member 297 substantially flush with side members 292 and having supporting pins 303, 304, whereby film spools may be supported in said structure by said pins 303, 304 and by the supporting pins of said side member 291.

18. A camera in accordance with claim 17, but wherein film drive means is directly mounted in the side members 291, 292, said film drive means including a shaft 310 having mounted thereon a driving flange 311 and a clutch wheel 312 and a counter wheel 313.

19. A camera in accordance with claim 17, but wherein the said hinged plate members 301, 302, when positioned flatwise, lie substantially flush with the side member 292, and wherein said side member 292 consists of two short portions at opposite ends of said bottom plate 290 and between which short portions lie the two hinged plate members 301, 302.

20. A camera in accordance with claim 17, but wherein film drive means is directly mounted in the side members 291, 292, and wherein said film driving means includes a shaft 310, a bushing 317 free to rotate on said shaft, an inner clutch drive member 318 fitted over said bushing 317, and an outer clutch member 312 fast to said shaft 310 and having a cylindrical wall spaced from and surrounding said inner clutch drive member 318, and clutch means interposed between said clutch member 318 and said cylindrical wall.

21. A camera in accordance with claim 17, but wherein film drive means is directly mounted in the side members 291, 292, and wherein said film driving means includes a shaft 310, a bushing 317 free to rotate on said shaft, an inner clutch drive member 318 fitted over said bushing 317, and an outer clutch member 312 fast to said shaft 310 and having a cylindrical wall spaced from and surrounding said inner clutch drive member 318, and clutch means interposed between said clutch member 318 and said cylindrical wall, said clutch means comprising clutch plates 321, 322 and spring means to press them yieldingly together.

22. A camera in accordance with claim 17, but wherein film drive means is directly mounted in the side members 291, 292, and wherein said film driving means includes a shaft 310, a bushing 317 free to rotate on said shaft, an inner clutch drive member 318 fitted over said bushing 317, and an outer clutch member 312 fast to said shaft 310 and having a cylindrical wall spaced from and surrounding said inner clutch drive member 318, and clutch means interposed between said clutch member 318 and said cylindrical wall, and wherein the inner clutch drive member 318 has fast thereon a gear in meshing relation with the film take-up spool.

23. A camera of the hand-carried type having a box-like body portion substantially rectangular in cross section, and having a door constituting the entire rear wall of the said camera body portion, two opposite side cover plates detachably secured thereto, film feeding mechanism within said body portion mounted upon the inner face of one of said side cover plates, a film feed magazine received within the said camera body portion alongside of said film feed mechanism, and removable from said body portion as a unit through said door at the rear of said box-like body, said magazine having therein a film supply roll and a film take-up roll mounted therein and also having therein a shaft for driving said film take-up roll, mounted in and extending out through a side wall of said magazine, and operative driving connections between the film feed mechanism upon one of said side cover plates and said shaft, whereby actuation of said film feed mechanism feeds the film in said magazine.

24. A camera in accordance with claim 23, but wherein the said magazine contains film supporting means including a counter wheel that is mounted upon said shaft and rotated by the feeding movement of the film, and a counter-dial attached to a wall of said magazine that is positioned flatwise against the door constituting the rear wall of the camera body portion when the magazine is positioned in the camera, and wherein there are operating connections between the said counter wheel and the said counter dial, so that the latter is moved at each feeding movement of the film.

25. In a hand-supported camera having an automatic handle-locking means for locking the film feeding means and the shutter rewinding means of the camera until after the shutter release lever of the camera has been released to make an exposure and has returned to its normal position, the following combination of co-acting parts: a camera casing of box-like form and having two opposite enclosing sides upon the inner face on one only of which the film feeding means and the shutter rewinding means are carried, a shaft supported in that enclosing side on which the film feeding means and the shutter rewinding means are carried and extending out therefrom, a prolonged, film feeding, shutter rewinding, holding handle mounted upon said shaft and extending therefrom in substantial parallelism with the enclosing side of the camera in which said shaft is supported sufficiently far so as to be firmly grasped by the operator for holding the camera and for operating the same, said handle having only a swing forward-and-return operating movement, and automatic handle locking means operatively connected to and so as to be thereby moved automatically by the said movement of said handle, thereby automatically to lock said handle upon the completion of the said return movement of the handle following the forward movement thereof, until the shutter release lever has been released to make an exposure and has returned to its normal position, whereby said automatic handle-locking means locks the film feeding means and the shutter rewinding means and whereby the handle-locking means is disengaged by the shutter release lever upon completion of the movement of the shutter release lever.

26. A photographic camera of the character specified in claim 25, but wherein, for the purpose of locking the said film feeding, shutter rewinding handle until after the shutter release lever has been operated and has returned to its normal position, the said shaft is provided with a notch, and there is provided a locking lever to engage said notch, and wherein means is provided operatively connected to the shutter release lever to cause engagement of said locking lever with said notch of said shaft, thereby to prevent movement of said locking lever and of said film-feeding shutter rewinding handle, after the shutter has been opened and closed.

27. A photographic camera of the character specified in claim 25, but wherein, for the purpose of locking the said film feeding, shutter rewinding handle until after the shutter release lever has been operated and has returned to its normal position, the said shaft is provided with a notch, and there is provided a bell crank lever having a finger to engage said notch, and wherein the shutter release lever is operatively connected to said bell crank lever, a second lever, and a link connected to said lever, and which link in its movement engages said bell crank lever to move the same and withdraw the finger thereof from engagement with said notch of said shaft.

28. A photographic camera of the hand-carried type having a readily insertible and readily removable, fully enclosed, film carrying, film presenting magazine, said camera having a box-like body portion substantially rectangular in cross section, having two opposite side cover plates and having interiorly an upright partition extending from top to bottom thereof at a sufficient distance from the back of the camera for the reception of said film carrying, film presenting magazine in functioning position, a door mounted at the back of the camera through which the said magazine is inserted and withdrawn, said film magazine when in position in the camera being received in functioning position flatwise against said upright partition, said magazine having therein a film supporting spool and a film take-up spool, said latter spool being accessible through a wall of said magazine for receiving film feeding movements, film feeding means supported interiorly of said box-like camera body portion upon one only of said side cover plates, and operatively connected with the film take-up spool when the magazine is positioned in the camera, and an operating member supported in said body portion upon the said cover plate supporting the film feeding means, and extending out from the wall of said camera body portion and operatively connected to the said film feeding means, whereby movement imparted to said member feeds the film by rotation of said spools.

29. A camera in accordance with claim 25, but wherein the means for automatically locking the said operating handle includes means to engage a handle holding formation on the said shaft whereon said handle is supported, and a movably mounted member operatively connected with the handle and moved by movement of said handle to engage said holding formation, and thereby to lock said operating handle for the purpose stated in said claim 25.

30. A camera in accordance with claim 25, wherein the shaft whereon the said operating handle is supported is provided with a notch, and wherein there is provided a movably mounted member to engage said notch to hold the said shaft from movement, and wherein there is provided means operatively connected with the said handle to move such movable members by movement of the handle, and thereby to cause such movable member to engage said notch at a time when further movement of said handle should be prevented.

31. In a photographic camera of the hand-supported hand-operated type, a camera casing of box-like form substantially rectangular in cross section and having two opposite substantially rectangular side cover plates, upon the inner face of one only of which the film feed mechanism and the shutter rewinding means are carried, said camera casing having therein film feed mechanism to feed film, and a shutter, and means to set the shutter, a shaft operatively connected to the film feed mechanism and to the shutter setting mechanism and mounted only in that side cover plate on which the film feed mechanism is mounted, an operating handle connected to said shaft and by which the shaft may be rocked back and forth to feed the film and set the shutter, a shutter rewind plate mounted upon said shaft and operatively connected to the shutter rewinding means the latter being operatively connected to the shutter, a cam plate movably mounted upon said shutter rewind plate and by its movement upon the shutter rewind plate establishing the shutter aperture, said cam plate being operatively connected to the said shutter setting mechanism, a shaft within said first mentioned shaft to turn said cam plate in either direction, and a shutter setting knob mounted upon the said shaft within said first mentioned shaft, and having means whereby it may be adjusted relatively to change the shutter speed.

32. A photographic camera in accordance with claim 31, wherein the inner shaft is an arcuately adjustable shaft axially positioned within the said first mentioned shaft and having thereon the said cam plate and the said shutter setting knob, the rotative position of said cam plate being determined by the position of the shutter setting knob with respect to said operating handle by said arcuate adjustment of said inner shaft.

33. A photographic camera in accordance with claim 31, but wherein there is a shaft having thereon a lever, and wherein there is an operating connection between said lever and the said cam plate, and wherein said movably mounted cam plate is rotatively adjustable through the turning movement of said shutter setting knob, whereby the degree of rotation of the said lever will be determined by the position of the said cam plate with respect to the said shutter rewind plate, thereby to control the amount of shutter rewind, thus establishing the shutter aperture.

34. A photographic camera of the hand-supported hand-operated type having a box-like body portion substantially rectangular in cross section and having a door at the back thereof, two opposite, substantially flat, rectangular, side, cover plates structurally distinct from but secured respectively at opposite sides of the rectangular body portion to constitute the sides of the camera, film feed mechanism mounted within said body portion upon the inner face of one of said side cover plates, a fully enclosed film feed magazine received within the said camera body portion and removable as a unit through the back of said box-like body and operatively connectable to, but readily separable from, the said film feed mechanism, the said camera having mounted at the outside of that one of said side cover plates thereof that has the film feed mechanism mounted thereon, a prolonged, camera-carrying handle movable to-and-fro only, for operating at least the film feed mechanism, a shaft mounted in the last-mentioned one only of said side cover plates and terminating inwardly at substantially the inner face of said side cover plate, said handle being fixed upon said shaft at the outside of said last-mentioned side cover plate, said shaft and its said handle being therefore movable only to-and-fro, said shaft being operatively connected to said film feed magazine upon insertion of the magazine into the camera body portion, and locking means operatively connected to said handle and moved by movement of said handle, for automatically locking the said handle from movement, upon the completion of each feeding movement of the film by said handle, the said handle by the said locking means being kept so locked until after the exposure of the just fed film area has actually been made.

35. A photographic camera of the hand-supported hand-operated type having a box-like body portion substantially rectangular in cross section and having a door at the back thereof, two opposite, substantially flat, rectangular, side, cover plates structurally distinct from but secured respectively at opposite sides of the rectangular body portion to constitute the sides of the camera, film feed mechanism mounted within said body portion upon the inner face of one of said side cover plates, a fully enclosed film feed magazine received within the said camera body portion and removable as a unit through the back of said box-like body and operatively connected to, but readily separable from the said film feed mechanism, the said camera having mounted at the outside of the side cover plate only on which the said film feed mechanism is mounted, a prolonged, camera-carrying handle movable to-and-fro only, for operating at least the film feed mechanism, a shaft mounted in that one only of said side cover plates upon the inner face whereof the film feed mechanism is mounted and terminating inwardly at substantially the inner face of said side cover plate, said shaft being operatively connected to the film feed mechanism, said handle being fixed upon said shaft at the outside of such side cover plate, said shaft and its said handle being therefore movable only to-and-fro.

36. A photographic camera of the hand-supported hand-operated type having a box-like portion substantially rectangular in cross section, two opposite, substantially rectangular, side, cover plates at opposite sides of the rectangular body portion to constitute the sides of the camera, film feed mechanism mounted within said body portion upon the inner face of one of said side cover plates, a fully enclosed film feed magazine received within the said camera body portion and operatively connected to, but readily separable from the said film feed mechanism, the said camera having mounted at the outside of that one of said side cover plates thereof that has the film feed mechanism upon its inner face a prolonged, camera-carrying handle movable to-and-fro only, for operating the film feed mechanism, a shaft mounted in the last-mentioned of said side cover plates and terminating inwardly at substantially the inner face of said last-mentioned side cover plate, said shaft being operatively connected to the film feed mechanism, said handle being fixed upon said shaft at the outside of such last-mentioned side cover plate, said shaft and its said handle being movable only to-and-fro, and locking means operatively connected to said handle and moved by movement of said handle, for automatically locking the said handle from movement, upon the completion of each feeding movement of the film by said handle, the said handle by the said locking means being kept so locked until after the exposure of the just fed film area has actually been made.

37. A photographic camera of the hand-supported hand-operated type having a box-like body portion substantially rectangular in cross section and having a door at the back thereof, two opposite, side, cover plates at opposite sides of the said rectangular body portion to constitute the sides of the camera; film feed rewind mechanism, a shutter release member, a shutter setting knob, a shaft carrying an operating handle and operatively connected to the film feed rewind mechanism, and shutter speed setting and shutter rewind mechanism, all of which, excepting said shutter-setting knob and shutter release member, but including the shaft carrying the operating handle, are mounted upon the inside of one only of said side cover plates, and shutter control mechanism mounted upon the inside of the other one of said side cover plates, the said operating handle, being a prolonged camera-carrying handle movable back-and-forth only and operatively connected to the film feed mechanism and the shutter rewind mechanism to operate them and being in close parallelism with said cover plate in which its shaft is mounted.

38. A photographic camera in accordance with claim 37, wherein there is provided means operatively connected to said handle and moved by movement of said handle, for automatically locking the said handle from movement, upon the completion of each feeding movement of the film by said handle, the said handle by the said locking means being kept so locked until after the exposure of the just fed film area has actually been made.

39. In a camera adapted to be hand-operated in use, means therein to support a film, and means to feed the film for successive exposures, a shutter with shutter operating means and shutter releasing means, shutter rewinding means, said camera having a casing of box-like form and having two opposite side cover plates constituting walls and upon the inner face of one of which the means to feed the film and the shutter rewinding means are mounted, a shaft mounted in that one only of said side cover plates upon which are mounted the means to feed the film and the shutter rewinding means operative connections between said shaft and said two last-named means to feed the film and the shutter operating means, said shaft extending out through the adjacent side cover plate of the camera, a prolonged film-feeding shutter-rewinding holding-handle mounted upon the outer end of said shaft and extending therefrom in substantial parallelism with said side cover plate of the camera, said handle having only a swinging-forward-and-return operating movement, and interlocking means operatively connected to and therefore operated by movement of said handle to lock said handle automatically upon completion of said return of said handle, the shutter releasing means being operatively connected to the handle locking means to release the said handle, thereby locking the film feeding means and the shutter rewinding means until the shutter releasing means has been released to make an exposure and has returned to its normal position.

40. A camera in accordance with claim 39, but wherein the means for automatically locking the operating handle includes a holding formation on the shaft whereon said operating handle is supported, and means operatively connected to said handle to engage said formation, thereby locking said handle.

41. A camera in accordance with claim 39, but wherein the shaft whereon the operating handle is supported is provided with a notch, and wherein there is provided a movable part to engage said notch to hold the said shaft from movement, and wherein there is provided means to move said part to cause it to engage said notch at a time when movement of said handle should be prevented.

42. A photographic camera comprising a camera casing adapted to be hand-supported in use and having a box-like body and opposite side cover plates and having means mounted upon the inside of one of said side cover plates to feed the film for successive exposures, a short shaft mounted upon the last mentioned one only of said side cover plates, a shaft-supported operating handle on said shaft outside the camera casing and movable only to-and-fro with said shaft, said shaft being mounted wholly in said last mentioned side cover plate, and operative connections from said shaft to said means to feed the film for thereby feeding the film after each exposure, said handle constituting the part by which the camera is manually supported in use, means operatively connected with said handle and operated by movement of said handle for automatically locking the said supporting operating handle upon the completion of each feeding movement of the film and by which locking means the said handle is kept locked until after the exposure of the just fed film area has actually been made, shutter release means, and means operatively connecting the shutter release means to the locking means to disengage the locking means upon operation of the shutter release means.

43. A photographic camera in accordance with claim 42, wherein shutter rewind mechanism is also mounted upon the inside of the same side cover plate wherein said short shaft is mounted, and operating connections between said shutter rewind mechanism and said operating shaft, thereby to effect the rewinding of the shutter by operating movement of said handle.

44. A photographic camera in accordance with claim 42, wherein said shaft is provided with spaced stop formations and stop means supported adjacent to said shaft for engagement with said formations to limit the rocking movement of said shaft in either direction upon turning operating movement of said handle in either direction, a shutter release lever and a lever 118 operatively connected with said shutter release lever, a link 125 connected to said lever 118 and having a floating dog 130, and a bell crank lever 151 having a finger 152, said floating dog being so located as, when operated, to trip said bell crank lever 151, and wherein the said shaft is provided with a flange 103 having a notch 157 to be engaged by said finger 152 of the bell crank lever 151, thereby holding said operating handle from forward film feeding movement.

45. A photographic camera in accordance with claim 42, wherein said shaft has a notched flange, and wherein there is a bell crank lever 151 mounted and supported to engage said notched flange, and means to operate said bell crank lever, thereby to hold said operating handle from film feeding movement, and wherein there is provided to cooperate with the lever 151 a lever 118 having attached thereto a link 125 carrying a dog 130 to trip said bell crank lever 151.

46. A photographic camera in accordance with claim 42, wherein there is provided a shutter release lever 39, a lever 118 mounted and supported to be moved by releasing movement of said release lever 39 and bell crank lever 127 connected to the lever 118, and cooperating with the film feeding means.

47. A photographic camera in accordance with claim 42, wherein said shaft has a notched flange formation, and wherein a bell crank lever 151 has a formation to engage such notch to hold said shaft and said operating handle carried thereby from film feeding movement, a shutter release lever 39, a lever 118 mounted to be rocked by movement of said release lever when the shutter is released, the bell crank lever 151 having means to engage said notched formation of said shaft to hold said shaft from movement, and operative connections between and cooperating in action with said lever 118 and with said lever 151, said operative connections including a link 125 connected to the lever 118 and having a floating dog 130 to engage and move said lever 151, and means for controlling movements of said lever 151, including a bell crank lever 127 connected to the link 125, and an interlock member 146 mounted and positioned to engage an arm of said lever 151 and co-acting in operation with said floating dog 130 to lock lever 151 out of locking position after said dog has moved said lever 151 out of locking position.

48. A photographic camera in accordance with claim 42, wherein said shaft has a notched flange formation, and wherein a bell crank lever 151 has a formation to engage such notch to hold said shaft and said operating handle carried thereby from film feeding movement, a shutter release lever 39, a lever 118 mounted to be rocked by movement of said release lever when the shutter is released, the bell crank lever 151 having a formation to engage said notched formation of said shaft to hold said shaft from movement, and operative connections between and cooperating in action with said lever 118 and with said lever 151, said operative connections including a link 125 connected to said lever 118 and having a floating dog 130, a bell crank lever 127 connected to the link 125, the said lever 151 having an arm 153, an interlock member 146 to engage the arm 153 of said lever 151, and cooperating in action with said floating dog 130, a bell crank lever 127 pivotally connected to said link 125, whereby when the shutter release lever 39 is released the lever 118 is rocked, thereby rocking bell crank lever 127 and moving the connecting link 125 and the floating dog 130, thereby withdrawing the arm 152 of the bell crank lever 151 from the notched formation of the said shaft, thereby causing the arm 153 of the lever 151 to release said interlock member 146, and whereby the floating dog 130 is withdrawn from the bell crank lever 151, allowing said lever 151 to turn so that the arm 153 of the lever 151 is engaged by the interlock member 146, thereby holding the arm 152 of the bell crank 151 out of engagement with the notched formation of the said shaft, thus permitting the said operating handle to be moved by the operator in a film feeding direction.

49. A photographic camera in accordance with claim 42, wherein there is provided a shutter release lever, a film rewind pinion 80 rotated by film-feeding movement of said operating handle, a gear 86 meshing with the film rewinding pinion 80, a cam plate 89 fast to one face of the gear 86 and having spaced cams 89a, a lever 141 having a formation to engage the cams 89a, an interlock member 146 mounted to be moved by movement of said lever 141 from one of said cams 89a, a bell crank lever 151 having an arm 153, whereby the rotation of the cam plate 89 and consequent movement of said lever 141 withdraws said interlock member 146 from the arm 153 of said bell crank lever 151, permitting the latter to rotate until a formation thereof engages the holding formation with which the said shaft is provided, thereby locking the said operating handle and preventing further movement thereof until the shutter release lever has been operated and released.

50. A photographic camera having a box-like body and opposite side cover plates secured thereto and having means mounted upon the inside face of one of said side cover plates to feed a film for successive exposure, shutter rewinding mechanism also mounted upon the inside face of the last mentioned side cover plate, a short notched shaft mounted only in said last mentioned side cover plate and terminating at the inner face thereof, an operating handle constituting one of the supports for the camera in carrying the same, and fast upon the said shaft at the outer face of said last mentioned side cover plate, said shaft and said handle having only a forward-and-return swinging operating movement, means connecting said shaft both to the film feeding means and the shutter rewinding means, thereby to operate them by said movement of said handle, and an interlock operatively connected to the said operating handle means controlled thereby to engage said notched portion of said shaft to lock the said operating handle in fixed position on said shaft after the shutter has been rewound by said operating movement of said operating handle and until the exposure has been made by the shutter, and shutter release means operatively connected to said interlock to release said interlock upon completion of the operation of the shutter release means, whereby the said operating handle cannot again be operated to feed the film or to rewind the shutter until the next cycle of camera operations.

51. A photographic camera of the hand-carried type having a box-like casing frame substantially rectangular in cross section, said casing frame having two opposite side cover plates structurally distinct from but secured to said casing frame to constitute two opposite sides thereof, film feed mechanism, and shutter speed setting and rewind mechanism within said casing frame and mounted upon the inner faces of one of said two side cover plates, shutter control mechanism mounted upon the inner face of said other side cover plate, a carrying handle attached to the outer face of that one of said side cover plates carrying the shutter control mechanism, a short transversely extending shaft mounted in the other one only of said cover plates and extending outwardly therethrough, a prolonged, film feeding, shutter rewinding, holding handle mounted upon the outer end of said shaft and extending downwardly therefrom in substantial parallelism with the cover plate in which said shaft is mounted, said handle having only a swinging, forward-and-return operating movement with said shaft, means mounted in said casing frame between said cover plates to support a film, a shutter release lever operatively connected to said handle and mounted upon the outer face of that one of said side cover plates in which said short transversely extending shaft is mounted, means operatively connected to said shaft and to said shutter rewind mechanism for effecting rewinding of the shutter, said film feed mechanism being operatively connected to said shaft, the said film feeding means and the said shutter rewinding mechanism being operated by the said forward-and-return movement of said holding and operating handle.

52. A photographic camera in accordance with claim 51, wherein there is provided interlocking means operatively connected to and operated by movement of said film feeding, shutter rewinding handle to lock said handle upon the completion of said return movement of the handle, thereby locking the film feeding means and shutter rewinding means until the shutter release lever has been released to make an exposure and has returned to its normal position and means operatively connecting the shutter release lever to the interlocking means to release said interlocking means after operation of the said shutter release lever has been completed.

53. A photographic camera of the hand-supported hand-operated type having a box-like portion, two opposite, substantially flat, side cover plates structurally distinct from but secured respectively at opposite sides of the body portion to constitute the sides of the camera, film feed mechanism mounted within said body portion upon the inner face of one of said side cover plates, a fully enclosed film feed magazine received within the said camera body portion and operatively connected to, but readily separable from, the said film feed mechanism, the said camera having mounted at the outside of that one of said side cover plates thereof on which the film feed mechanism is mounted a prolonged, camera-carrying handle movable to-and-fro only, for operating the film feed mechanism, a shaft mounted in that one only of said side cover plates on which said handle, movable to-and-fro, is mounted and terminating inwardly at substantially the inner face of said side cover plate and operatively connected to the film feed mechanism, said handle being fixed upon said shaft at the outside of such side cover plate, said shaft and its said handle being therefore movable only to-and-fro, and locking means operatively connected to said handle and moved by movement of said handle, for automatically locking the said handle from movement, upon the completion of each feeding movement of the film by said handle, the said handle by the said locking means being kept so locked until after the exposure of the just fed film area has actually been made, said camera having shutter rewinding mechanism and shutter release mechanism, and a manually operable shutter release member for operating said shutter release mechanism, said shutter release member being operatively connected to said locking means, whereby, when the said shutter release member is operated for making an exposure, the said handle is unlocked from the control of said locking means to permit said handle to be again manually moved through a to-and-fro movement thereof, for feeding further film and for rewinding the shutter for another exposure.

54. A photographic camera in accordance with claim 37, wherein locking means is mounted in said body portion and is operatively connected in operation both to said handle and to said release member, thereby to lock said handle by said locking means upon the completion of each back-and-forth movement of said handle and to unlock said handle from the control of said locking means upon the manual operation of said release member.

55. A photographic camera in accordance with claim 42, wherein said box-like body has mounted therein shutter release mechanism and a manually operable shutter release member for said shutter release mechanism, and wherein locking means is mounted in said box-like body and wherein said locking means is operatively connected both to said handle and to said shutter release member, thereby to lock said handle upon the completion of each to-and-fro movement thereof, and also upon manual manipulation of said release member, thereby to unlock said handle for the next to-and-fro movement thereof.

56. A photographic camera having a body portion provided at opposite sides with cover plates and also provided with film supporting means, film feeding means, and shutter mechanism including shutter rewinding mechanism and shutter release mechanism; said film feeding means and shutter rewinding mechanism being mounted upon the inner face of one only of said cover plates a manually operable shutter release member to release by manual movement thereof said shutter release mechanism, a shaft mounted for swinging movement in that cover plate only on the inner face whereof the film feeding means and the shutter rewinding mechanism are mounted and having fast thereon a manually manipulated operating handle by which the camera may be supported in part at least, said handle and shaft having only a forward-and-return swinging movement, connecting means mounted in said camera body portion, connecting in operation said shaft and said film feeding means, and operated by said movement of said handle to actuate said film feeding means, thereby to advance film for the next exposure and to rewind the shutter by movement of said shutter rewinding mechanism, preparatory to the next exposure, locking means supported in said body portion and operatively connected to said handle, and moved upon movement thereof by said operating handle in its own movement to lock automatically the said handle from movement, at the end of the said return movement of said handle, and means operatively connected to and operated by manual movement of said shutter release member to operate the shutter release mechanism for making said next exposure, and thereupon to unlock the said handle from the control of said locking means, to permit said handle to be again manually moved through a forward-and-return movement thereof for feeding further film and for rewinding the shutter for another exposure.

57. A photographic camera in accordance with claim 56, wherein the said locking means and the means for moving the same to affect its functioning, include a lever 118 connected to the shutter release member, a link 125 mounted to said lever 118 and moved thereby, a bell crank 127 connected to said link 125 and moved thereby, a dog 130 connected to said link 125, a lever 151 having a formation to engage said shaft to prevent movement thereof while so engaged, said lever 151 being engageable by said dog 130, an interlock member 146 cooperatively engaging upon movement said lever 151, a lever 141 engaging said interlock member 146 to move the same, a cam plate 89 with which said lever 141 engages, and means operatively connected to said shaft and operating handle to impart turning movement to said cam plate, to move said lever 141, and thereby to move said interlock member 146.

58. A photographic camera in accordance with claim 56, wherein the said locking means and the means for moving the same to affect its functioning include an interlock member 146 to hold the locking means unlocked.

59. A photographic camera in accordance with claim 56, wherein the said locking means and the means for moving the same to affect its functioning include an interlock member 146, and operative connections between the said interlock member 146 and said release member, whereby, upon movement of said release member to release the shutter release mechanism, the said interlock member 146 is moved to hold the said operating handle unlocked.

60. A photographic camera in accordance with claim 56, wherein the said locking means and the means for moving the same to affect its functioning include an interlock member 146, and operative connections between the said interlock member 146 and said operating handle, whereby, upon its return swinging movement, the said interlock member 146 is moved to lock the said operating handle from further movement.

61. A photographic camera in accordance with claim 56, wherein the said locking means and the means for moving the same to affect its functioning include an interlock member 146, and operative connections to said interlock member 146 from said operating handle and to said interlock member from said shutter release member, whereby the interlock member 146 is moved to lock said operating handle upon the return swinging movement of said operating handle, and is thereafter moved to hold the said locking means in unlocked position.

62. A photographic camera of the hand-supported hand-operated type having a box-like body portion, two opposite side cover plates structurally distinct from but secured respectively at opposite sides of the body portion to constitute the sides of the camera, film feed mechanism mounted within said body portion upon the inner face of one of said side cover plates, a film feed magazine received within the said camera body portion and operatively connectable to, but readily separable from, the said film feed mechanism, the said camera having mounted at the outside of that one of said side cover plates thereof which has said film feed mechanism mounted upon the inner face thereof a prolonged, camera-carrying handle movable to-and-fro only, for operating at least the film feed mechanism, a shaft mounted in that one of said side cover plates upon the inner face of which the said film feed mechanism is mounted, and connected to the said film feed mechanism to operate the same, said handle being fixed upon said shaft at the outside of such last-mentioned side cover plate, said shaft and its said handle being movable only to-and-fro, and locking means operatively connected to said handle and moved by movement of said handle, for automatically locking the said handle from movement, upon the completion of each feeding movement of the film by said handle, the said handle by the said locking means being kept so locked until after the exposure of the just fed film area has actually been made.

EDSON S. HINELINE.

REFERENCES CITED

The following references are of record in the file of this patent:

UNITED STATES PATENTS

| Number | Name | Date |
|---|---|---|
| 500,875 | Faucompre | July 4, 1893 |
| 1,817,182 | Fairchild | Aug. 4, 1931 |
| 1,863,573 | Lutz et al. | June 21, 1932 |
| 1,966,261 | Petit et al. | July 10, 1934 |
| 1,977,569 | Hineline | Oct. 16, 1934 |
| 2,102,574 | Reason et al. | Dec. 14, 1937 |
| 2,131,926 | Weiblen et al. | Oct. 4, 1938 |
| 2,140,050 | Hart | Dec. 13, 1938 |
| 2,148,636 | Muller et al. | Feb. 28, 1939 |
| 2,233,390 | Kende et al. | Feb. 25, 1941 |
| 2,256,517 | Cohen | Sept. 23, 1941 |
| 2,347,732 | Briechle et al. | May 2, 1944 |
| 2,352,181 | Bolsey | June 27, 1944 |
| 2,364,891 | Cooper | Dec. 12, 1944 |
| 2,367,195 | Bolsey | Jan. 16, 1945 |
| 2,381,033 | Bolsey | Aug. 7, 1945 |
| 2,386,538 | Bolsey | Oct. 9, 1945 |
| 2,386,575 | Simmon et al. | Oct. 9, 1945 |
| 2,398,412 | Crumrine | Apr. 16, 1946 |
| 2,402,149 | Crumrine | June 18, 1946 |
| 2,403,587 | Doyle et al. | July 9, 1946 |
| 2,406,366 | Graef | Aug. 27, 1946 |
| 2,409,605 | Bolsey | Oct. 15, 1946 |
| 2,417,240 | Crumrine | Mar. 11, 1947 |
| 2,418,992 | Simmon | Apr. 15, 1947 |
| 2,423,562 | Lee | July 8, 1947 |

FOREIGN PATENTS

| Number | Country | Date |
|---|---|---|
| 125,615 | Great Britain | May 1, 1919 |
| 685,442 | France | Apr. 1, 1930 |
| 650,868 | Germany | Oct. 2, 1937 |
| 495,276 | Great Britain | Nov. 10, 1938 |
| 497,517 | Great Britain | Dec. 21, 1938 |
| 576,223 | Great Britain | Mar. 25, 1946 |